(12) United States Patent
Hoyos et al.

(10) Patent No.: US 10,678,898 B2
(45) Date of Patent: *Jun. 9, 2020

(54) SYSTEM AND METHOD FOR AUTHORIZING ACCESS TO ACCESS-CONTROLLED ENVIRONMENTS

(71) Applicant: VERIDIUM IP LIMITED, London (GB)

(72) Inventors: Hector Hoyos, New York, NY (US); Jason Braverman, Toronto (CA); Scott Streit, Baltimore, MD (US); Geoffrey Xiao, Lexington, MA (US); Jonathan Francis Mather, Oxford (GB)

(73) Assignee: VERIDIUM IP LIMITED, London (GB)

( * ) Notice: Subject to any disclaimer, the term of this patent is extended or adjusted under 35 U.S.C. 154(b) by 24 days.

This patent is subject to a terminal disclaimer.

(21) Appl. No.: 15/980,818

(22) Filed: May 16, 2018

(65) Prior Publication Data
US 2018/0260553 A1    Sep. 13, 2018

Related U.S. Application Data

(63) Continuation of application No. 14/995,769, filed on Jan. 14, 2016, now Pat. No. 9,996,684, which is a (Continued)

(51) Int. Cl.
*G06F 21/32* (2013.01)
*H04L 29/06* (2006.01)
(Continued)

(52) U.S. Cl.
CPC .............. *G06F 21/32* (2013.01); *G06F 21/34* (2013.01); *G06Q 20/40145* (2013.01);
(Continued)

(58) Field of Classification Search
None
See application file for complete search history.

(56) References Cited

U.S. PATENT DOCUMENTS 8,615,663 B2 * 12/2013 Buer ...................... H04L 9/3231
713/186
9,756,055 B2 * 9/2017 Hsu ......................... H04L 63/10
(Continued)

*Primary Examiner* — Kaveh Abrishamkar
(74) *Attorney, Agent, or Firm* — Leason Ellis LLP

(57) ABSTRACT

Systems and methods are provided for authorizing a user to access an access-controlled environment. The system includes a system server platform that communicates with fixed PC's, servers and mobile devices (e.g., smartphones) operated by users. The systems and methods described herein enable a series of operations whereby a user attempting to access an access-controlled environment is prompted to biometrically authenticate using the user's preregistered mobile device. Biometric authentication can include capturing images of the user's biometric features, encoding the features as a biometric identifier, comparing the biometric identifier to a previously generated biometric identifier and determining liveness. In addition, the authentication system can further authorize the user and electronically grant access to the access-controlled environment. In this manner the secure authentication system can, based on biometric authentication, authorize a user's access to devices, online services, physical locations or any networked environment that require user authorization.

20 Claims, 9 Drawing Sheets

Related U.S. Application Data continuation of application No. 14/668,352, filed on Mar. 25, 2015, now abandoned, which is a continuation of application No. 14/276,753, filed on May 13, 2014, now Pat. No. 9,003,196, and a continuation-in-part of application No. 14/201,438, filed on Mar. 7, 2014, now Pat. No. 9,208,492, and a continuation-in-part of application No. 14/201,499, filed on Mar. 7, 2014, now Pat. No. 9,294,475, and a continuation-in-part of application No. 14/201,462, filed on Mar. 7, 2014, now Pat. No. 9,313,200.

(60) Provisional application No. 61/822,746, filed on May 13, 2013, provisional application No. 61/842,800, filed on Jul. 3, 2013, provisional application No. 61/842,739, filed on Jul. 3, 2013, provisional application No. 61/842,757, filed on Jul. 3, 2013, provisional application No. 61/842,756, filed on Jul. 3, 2013, provisional application No. 61/921,004, filed on Dec. 26, 2013, provisional application No. 61/920,985, filed on Dec. 26, 2013, provisional application No. 61/922,438, filed on Dec. 13, 2013, provisional application No. 61/924,092, filed on Jan. 6, 2014, provisional application No. 61/924,097, filed on Jan. 6, 2014.

(51) Int. Cl.
*G06F 21/34* (2013.01)
*G06Q 20/40* (2012.01)

(52) U.S. Cl.
CPC .......... H04L 63/0861 (2013.01); H04L 63/10 (2013.01); H04L 63/102 (2013.01)

(56) References Cited

U.S. PATENT DOCUMENTS

| | | | |
|---|---|---|---|
| 9,996,684 B2* | 6/2018 | Hoyos | H04L 63/10 |
| 2010/0017619 A1* | 1/2010 | Errico | G06F 21/32 |
| | | | 713/186 |
| 2012/0030469 A1* | 2/2012 | Hsueh | H04L 63/0823 |
| | | | 713/175 |
| 2012/0109829 A1* | 5/2012 | McNeal | G06Q 20/3674 |
| | | | 705/67 |
| 2012/0290482 A1* | 11/2012 | Atef | G06F 21/31 |
| | | | 705/44 |

* cited by examiner

SYSTEM AND METHOD FOR AUTHORIZING ACCESS TO ACCESS-CONTROLLED ENVIRONMENTS

CROSS-REFERENCE TO RELATED APPLICATIONS

The present application is a continuation of U.S. patent application Ser. No. 14/995,769 entitled "SYSTEM AND METHOD FOR AUTHORIZING ACCESS TO ACCESS-CONTROLLED ENVIRONMENTS" filed on Jan. 14, 2016, and issued on Jun. 12, 2018, as U.S. Pat. No. 9,996,684, and is further related to and includes U.S. Patent Application Ser. No. 61/822,746, entitled "SYSTEM AND METHOD FOR PROVIDING BIOMETRICALLY AUTHENTICATED ACCESS USING MOBILE DEVICES" filed May 13, 2013; U.S. Patent Application Ser. No. 61/842,800, entitled "SYSTEM AND METHOD FOR PROVIDING BIOMETRICALLY AUTHENTICATED ACCESS USING MOBILE DEVICES" filed Jul. 3, 2013; U.S. Patent Application Ser. No. 61/842,739, entitled "SECURE BACK-END ARCHITECTURE SYSTEM AND METHOD" filed Jul. 3, 2013; U.S. Patent Application Ser. No. 61/842,757, entitled "SYSTEM AND METHOD FOR GENERATING A BIOMETRIC IDENTIFIER" filed Jul. 3, 2013; U.S. Patent Application Ser. No. 61/842,756, entitled "SYSTEMS AND METHODS FOR DETERMINING LIVENESS" filed Jul. 3, 2013; U.S. Provisional Patent Application Ser. No. 61/921,004, entitled "SYSTEM AND METHOD FOR DETERMINING LIVENESS" filed Dec. 26, 2013; U.S. Provisional Patent Application Ser. No. 61/920,985, entitled "SYSTEM AND METHOD FOR GENERATING A BIOMETRIC IDENTIFIER" filed Dec. 26, 2013; U.S. Provisional Patent Application Ser. No. 61/922,438, entitled "SYSTEM AND METHOD FOR BIOMETRIC PROTOCOL STANDARDS" filed Dec. 31, 2013; U.S. Patent Application Ser. No. 61/924,092, entitled "SECURE BACK-END ARCHITECTURE SYSTEM AND METHOD" filed Jan. 6, 2014; U.S. Patent Application Ser. No. 61/924,097, entitled "SYSTEM AND METHOD FOR SMARTPHONE SECURITY CASE" filed Jan. 6, 2014; U.S. patent application Ser. No. 14/201,438, entitled "SYSTEMS AND METHODS FOR BIOMETRIC AUTHENTICATION OF TRANSACTIONS" filed on Mar. 7, 2014, and issued on Dec. 8, 2015, as U.S. Pat. No. 9,208,492; U.S. patent application Ser. No. 14/201,462, entitled "SYSTEMS AND METHODS FOR DETERMINING LIVENESS" filed Mar. 7, 2014, and issued on Apr. 12, 2016, as U.S. Pat. No. 9,313,200; and U.S. patent application Ser. No. 14/201,499, entitled "SYSTEM AND METHOD FOR GENERATING A BIOMETRIC IDENTIFIER" filed on Mar. 7, 2014, and issued on Mar. 22, 2016, as U.S. Pat. No. 9,294,475, which are each hereby incorporated by reference as if set forth in their respective entireties herein.

TECHNICAL FIELD OF THE INVENTION

The present invention relates to systems and methods for providing authenticated access, in particular, systems and methods for providing biometrically authenticated access using a mobile device.

BACKGROUND OF THE INVENTION

There exist secure access systems for performing two-factor authentication for a user to a network resource (e.g., remote servers, electronically locked access points, etc.). One exemplary two-factor authentication system is The RSA SecurID® authentication mechanism by EMC Corporation of Bedford Mass. This exemplary system consists of a "token"—either hardware (e.g. a USB dongle) or software (a soft token)—which is assigned to a computer user and which generates an authentication code at fixed intervals (usually 60 seconds) using a built-in clock and the card's factory-encoded random key (known as the "seed record"). The seed record is different for each token, and is loaded into the corresponding system server as the tokens are purchased. The user authenticating must enter a personal identification number (PIN) and the generated authentication code being displayed at that moment.

However there have been the major breaches such systems, such as the breach of RSA in 2011, culminating in the loss of sensitive data from major corporations to unknown sources. Knowing the seed records, affords an attacker complete access to a user's information and access to anything they may use with their keys.

Pretty Good Privacy (PGP) is a data encryption and decryption computer program that provides cryptographic privacy and authentication for data communication. PGP can be used for signing, encrypting and decrypting texts, e-mails, files, directories and whole disk partitions to increase the security of e-mail communications. PGP, and other Private Key Encryption methods, are very secure, as long as certain circumstances remain true. In any private key exchange, if they private key is lost, stolen or misplaced, the user data is completely open. Conversely, if the user loses the key, the data they are protecting is lost forever. So, the tradeoff is apparent.

Numerous techniques have been proposed in the literature to deal with the problem of identity theft. Any such scheme tries to establish that a person is who she/he claims to be. Passwords, (long) private keys, and camouflaging are some of the approaches used for this purpose. Since human beings cannot remember long keys, private keys often tend to be stored in a wallet encrypted by possibly a small password. Unfortunately, all of these schemes have the property that someone who carries these credentials (such as the right keys and passwords) will be accepted as the right person even if these credentials have been stolen from others.

As a biometric is a biological characteristic (such as a fingerprint, the geometry of a hand, Retina pattern, iris shape, etc.) of an individual, biometric techniques can be used as an additional verification factor since biometrics are usually more difficult to obtain than other non-biometric credentials. Biometrics can be used for identification and/or authentication (also referred to as identity assertion and/or verification).

Biometric identity assertion can require a certain level of security as dictated by the application. For example, authentication in connection with a financial transaction or gaining access to a secure location requires higher security levels. As a result, preferably, the accuracy of the biometric representation of a user is sufficient to ensure that the user is accurately authenticated and security is maintained. However, to the extent iris, face, finger, and voice identity assertion systems exist and provide the requisite level of accuracy, such systems require dedicated devices and applications and are not easily implemented on conventional smartphones, which have limited camera resolution and light emitting capabilities.

The challenges surrounding traditional biometric feature capture techniques, which generally require high resolution imagery, multi-spectral lighting and significant computing power to execute the existing image analysis algorithms to achieve the requisite accuracy dictated by security have made biometric authentication not widely available or accessible to the masses. Moreover, traditional biometric authentication techniques requiring dedicated devices used in a specific way (e.g., require a cooperative subject, have a narrow field of view, biometric must be obtained in a specific way) detracts from user convenience and wide-scale implementation.

Accordingly, there is a need for systems and methods with which a user's identity can be verified conveniently, seamlessly, and with a sufficient degree of accuracy, from biometric information captured from the user using readily available smartphones. In addition, what is needed are identity assertion systems and methods that, preferably, are not reliant on multi-spectral imaging devices, multi-spectral light emitters, high resolution cameras, or multiple user inputs.

SUMMARY OF THE INVENTION

Technologies are presented herein in support of a system and method for authorizing a user's access to an access-controlled environment.

According to a first aspect, a method for authorizing a user to access an access-controlled environment includes the steps of receiving, by a computing device having a storage medium having instructions stored therein and a processor configured by executing the instructions therein, access-control information that identifies the access-controlled environment. The method also includes accessing, by the computing device, at least one database that includes user profiles that include information to identify respective users, to identify respective mobile devices, and to identify respective transaction accounts that are associated with respective access-controlled environments. In addition, the method includes receiving, by the computing device from a mobile device over a network, a transaction request including: a user identifier that identifies a user, and a mobile device identifier that identifies the mobile device, wherein the transaction request provides confirmation that the mobile device has biometrically authenticated the user. Furthermore, the method includes processing, by the computing device using the at least one database, the transaction request to authorize the user to access the access-controlled environment by determining: that the user identifier is associated with at least one user profile stored in the at least one database, that the mobile device identifier is associated with the at least one user profile, and that the at least one user profile identifies a transaction account associated with the access-controlled environment. The method also includes generating, by the computing device, an authorization notification that facilitates the authorized user to access to the access-controlled environment. In addition, the method includes transmitting, by the computing device to at least one remote computing device over a network, the authorization notification.

According to another aspect, a system is provided for authorizing access to an access-controlled environment, the system including a network communication interface, a computer-readable storage medium and one or more processors configured to interact with the network communication interface and the computer-readable storage medium and execute one or more software modules stored on the storage medium. The software modules include a database module, that when executed configures the one or more processors to access at least one database that includes user profiles that include information to identify respective users, respective mobile devices and respective transaction accounts that are associated with respective access-controlled environments. The software modules also includes a communication module that when executed configures the one or more processors to receive access-control information that identifies the access-controlled environment, and to receive from a mobile device over a network, a transaction request including: a user identifier that identifies a user, and a mobile device identifier that identifies the mobile device, wherein the transaction request provides confirmation that the mobile device has biometrically authenticated the user. The software modules also includes an authorization module that that when executed configures the one or more processors to process, using the at least one database, the transaction request to authorize the user to access the access-controlled environment by determining: that the user identifier is associated with at least one user profile stored in the at least one database, that the mobile device identifier is associated with the at least one user profile, and that the at least one user profile identifies a transaction account associated with the access-controlled environment. The authorization module also configures the one or more processors to generate an authorization notification that facilitates the authorized user to access to the access-controlled environment. Moreover, the communication module further configures the one or more processors to transmit the authorization notification to at least one remote computing device over a network.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

Figure 1:
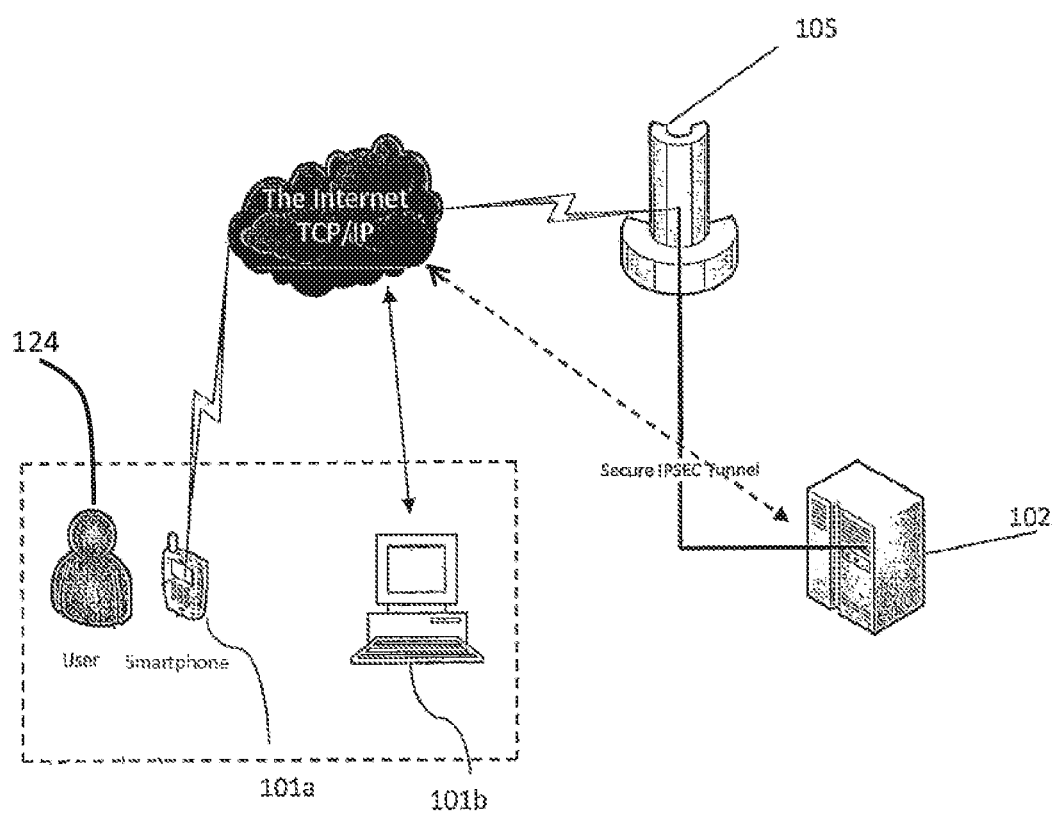
FIG. 1 is a high-level diagram of a system for authorizing access to an access-controlled environment in accordance with at least one embodiment disclosed herein.

By way of example only and for the purpose of overview and introduction, embodiments of the present invention are described below which concern a system and method for authorizing a user's access to an access-controlled environment (ACE) according to the user's biometric features.

In some implementations, the system includes a cloud based system server platform that communicates with fixed PC's, servers, and devices such as laptops, tablets and smartphones operated by users. As the user attempts to access a networked environment that is access-controlled, for example a website which requires a secure login, the user is prompted to authenticate using the user's preregistered mobile device. Authentication includes capturing biometric information in the form of at least images of the user's eyes, periocular region and face or any combination of the foregoing (collectively referred to as the Vitruvian region), extracting unique features and encoding the features as a identifier ("Vitruvian identifier") using the mobile device. The system can also generate a unique mobile device identifier according to unique identification information associated with the mobile device. The user can then be authenticated according to the biometric information and mobile device information by either the mobile device or the system server or a combination of the two. User authentication can also include determining whether the biometric information and other non-biometric information indicates that user is a live subject, and not a picture or video reproduction attempting to spoof the system. If user is successfully authenticated, the system can electronically grant access to the networked environment that the user's trying to access. For example, by transmitting an authorization notification to a third-party computing device. In this exemplary manner the secure authentication system can be used to authenticate user access to websites, VPNs, access at a physical door, access at an ATM, financial transactions or access to any computer systems that require user identification/authentication.

The systems and methods of the present application provide significant convenience for users as a function of biometrics-based access management and increased transaction security by supplementing or eliminating the need for passwords and/or devices dedicated to storing user account information, such as cards or token key-fobs and the like. It is provided that many of the principles disclosed herein are applicable to virtually any type of system requiring user authentication, such as for example website access, physical access control, home, user role determination, group identification, automation, password management, or other access. The present application removes a need for passwords, pins, tokens or the like from any computing environment, including global computing networks.

According to a salient aspect of the subject application, capturing images for the purpose of identifying a user's Vitruvian biometric features can be performed using conventional digital cameras that are commonly found on smart phones and other such mobile devices. In addition, identifying Vitruvian biometric features can be performed according to positive eye authentication techniques, preferably, applying algorithms analyzing the iris and/or periocular regions and/or face without requiring infra-red images or IR emitters which are not widely integrated in smartphones.

According to a salient aspect of the subject application, biometric features from the user's iris, periocular and/or facial regions can be extracted concurrently and seamlessly from common image captures (e.g., the same image frames and same sequence of image frames captured), whereas, current identification techniques generally extract iris features from certain image frames and periocular features from other image frames. Moreover, according to another salient aspect of the subject application, Vitruvian biometric features are identified and defined according to the spatial relationship of features ("keypoints") within a single frame and the dynamic movement or position ("flow") of those keypoints throughout a temporally arranged sequence of frames, so as to seamlessly generate an integrated Vitruvian biometric identifier of the user's Vitruvian region. The resulting integrated Vitruvian biometric identifier is a single, virtual representation of the user's Vitruvian region, as opposed to, independently generating a plurality of separate biometric identifiers (e.g., one for the iris, another for the periocular region) that are later fused. It can be appreciated that the identifiers can be encoded as one or more vectors including the biometric and non-biometric information.

The present disclosure also describes additional techniques for preventing erroneous authentication caused by spoofing. In some examples, the anti-spoofing techniques may include capturing multiple facial images of a user, and analyzing the facial images for indications of liveness. A salient aspect of the subject application is that the process for generating a Vitruvian identifier that includes information relating to the dynamic movement of keypoints is representative of liveness and/or can also be used to generate a liveness identifier. Using the liveness identifier, the disclosed system can determine "liveness" (e.g., whether the image sequence is of living user) and detect suspected attempts to spoof by comparing the current liveness identifier to a previously generated liveness identifier. In addition, liveness may be determined from analysis of the dynamic movement of low-level Vitruvian features to determine if the flow is representative of continuous motion. Liveness can also be indicated by the movement of intermediate level features such as the eyes, mouth, and other portions of the face. Such anti-spoofing programs may, in various implementations, detect facial movement based on specific areas of the human face. For example, the anti-spoofing programs may identify one or both eyes of the facial image as landmarks. The anti-spoofing programs may then detect and analyze transitions between the images as relates to one or both eyes. Using any detected transitions, the anti-spoofing programs may detect facial gestures such as a blink, and the like. Based on the analysis and the detection of a satisfactory, the liveness determination programs may prevent or grant access to functionalities controlled by the computing device.

An exemplary system for authorizing access to an access-controlled environment 100 is shown as a block diagram in FIG. 1. In one arrangement, the system consists of a system server 105 and one or more user devices 101 including a mobile device 101a and a computing device 101b. The system 100 can also include one or more remote computing devices 102.

The system server 105 can be practically any computing device and/or data processing apparatus capable of communicating with the user devices and remote computing devices and receiving, transmitting and storing electronic information and processing requests as further described herein. Similarly, the remote computing device 102 can be practically any computing device and/or data processing apparatus capable of communicating with the system server and/or the user devices and receiving, transmitting and storing electronic information and processing requests as further described herein. It should also be understood that the system server and/or remote computing device can be a number of networked or cloud based computing devices.

In some implementations, computing device 102 can be associated with an enterprise organization that maintains user accounts and require authentication of account holders prior to granting access to secure networked environments (e.g., secure website, bank, VPN, payment providers, and the like). The various types user's accounts used to access or interact with such networked environments are referred to herein as transaction accounts.

The user devices, mobile device 101a and user computing device 101b, can be configured to communicate with one another, the system server 105 and/or remote computing device 102, transmitting electronic information thereto and receiving electronic information therefrom as further described herein. The user devices can also be configured to receive user inputs as well as capture and process biometric information, for example, digital images and voice recordings of a user 124.

The mobile device 101a can be any mobile computing devices and/or data processing apparatus capable of embodying the systems and/or methods described herein, including but not limited to a personal computer, tablet computer, personal digital assistant, mobile electronic device, cellular telephone or smart phone device and the like. The computing device 101b is intended to represent various forms of computing devices that a user can interact with, such as workstations, a personal computer, laptop computer, dedicated point-of-sale systems, ATM terminals, access control devices or other appropriate digital computers.

As further described herein, the system for authorizing access to an access-controlled environment 100, facilitates the authentication of a user 124 according to a user's biometric features using a mobile device 101a. In some implementations, identification and/or authentication according to a user's biometric features utilizes a user's biometric information in a two stage process. The first stage is referred to as enrollment. In the enrollment stage samples (e.g., images) of appropriate biometric(s) is/are collected from an individual. These samples of biometrics are analyzed and processed to extract features (or characteristics) present in each sample. The set of features present in the biometric of an individual constitutes an identifier for the person and indicate whether the user is a live subject. These identifiers are then stored to complete the enrolment stage. In the second stage the same biometric of the individual is measured. Features from this biometric are extracted just like in the enrollment phase to obtain a current biometric identifier. If the goal is determining liveness, the features or characteristics can be analyzed to determine if they are representative of a live subject. If the goal is identification, then this identifier is searched for in the database of identifiers generated in the first phase. If a match occurs, the identification of the individual is revealed, otherwise identification fails. If the goal is authentication, then the identifier generated in the second stage is compared with the identifier generated in the first stage for the particular person. If a match occurs, authentication is successful, otherwise authentication fails.

In some implementations, the system server can be configured to securely facilitate identification/authentication of the user's identity (collectively referred to as "identity assertion") in furtherance of a transaction without authorizing the underlying transaction. In this manner, the server is not required to retain the user's sensitive transaction account information that is used to authorize the underlying transaction, instead, the system server is configured to authorize a user by recognizing one user from another at an appropriate level of security. For example, asserting the identity of a user conducting a bank transaction according to the standards required by the bank and notifying the bank's enterprise computing system (e.g., remote computing device 102) that the user has been authenticated. Accordingly, the exemplary systems and methods can supplement and/or replace the existing enterprise authentication processes by integrating with the existing infrastructure and processes without interfering with established processes for authorizing the transactions once a user's identity has been established for security purposes.

In addition to identity assertion, the system server 105 can also implement additional security processes, including role gathering and access control, so as to facilitate authorization of requested electronic transactions or otherwise control a user's access. As such, the user authorization process can include identity assertion and can also include authorization by determining whether the user's identity is associated with one or more transaction accounts. In addition, the transaction authorization process can also include determining the user's level of access using the transaction account, for example, whether the user has the requisite permissions to perform requested transactions at an ATM.

In some implementations, the system server 105 can also implement rules governing access to information and/or the transmission of information between a variety of computing devices that users can interact with (e.g., mobile device 101a, computing device 101b) and one or more trusted back-end servers (e.g., system server 105 and remote computing device 102). More specifically, the system server 105 can enforce rules governing the user's access to information, as well as the sharing of information with third-parties as authorized by the user. For example, the system server can regulate access to a database of information pertaining to a user, and which has been biometrically authenticated by the user, and limit access to that information according to rules defined by the user. By way of further example, maintaining a database of information and granting access to the information to an authenticated user according to rules or permissions previously granted to the user.

Exemplary systems and methods for facilitating identity assertion, role gathering, access control and other security functions of the system server 105, including auditing and security assurance and accountability are further described herein and in co-pending and commonly assigned U.S. Provisional Patent Application Ser. No. 61/922,438, entitled "SYSTEM AND METHOD FOR BIOMETRIC PROTOCOL STANDARDS" filed Dec. 31, 2013.

It should be noted that while FIG. 1 depicts the system for authorizing access to an access-controlled environment 100 with respect to a mobile device 101a and a user computing device 101b and a remote computing device 102, it should be understood that any number of such devices can interact with the system in the manner described herein. It should also be noted that while FIG. 1 depicts a system 100 with respect to the user 124, it should be understood that any number of users can interact with the system in the manner described herein.

It should be further understood that while the various computing devices and machines referenced herein, including but not limited to mobile device 101a and system server 105 and remote computing device 102 are referred to herein as individual/single devices and/or machines, in certain implementations the referenced devices and machines, and their associated and/or accompanying operations, features, and/or functionalities can be combined or arranged or otherwise employed across any number of such devices and/or machines, such as over a network connection or wired connection, as is known to those of skill in the art.

It should also be understood that the exemplary systems and methods described herein in the context of the mobile device 101a are not specifically limited to the mobile device and can be implemented using other enabled computing devices (e.g., the user computing device 102b).

Figure 2A:
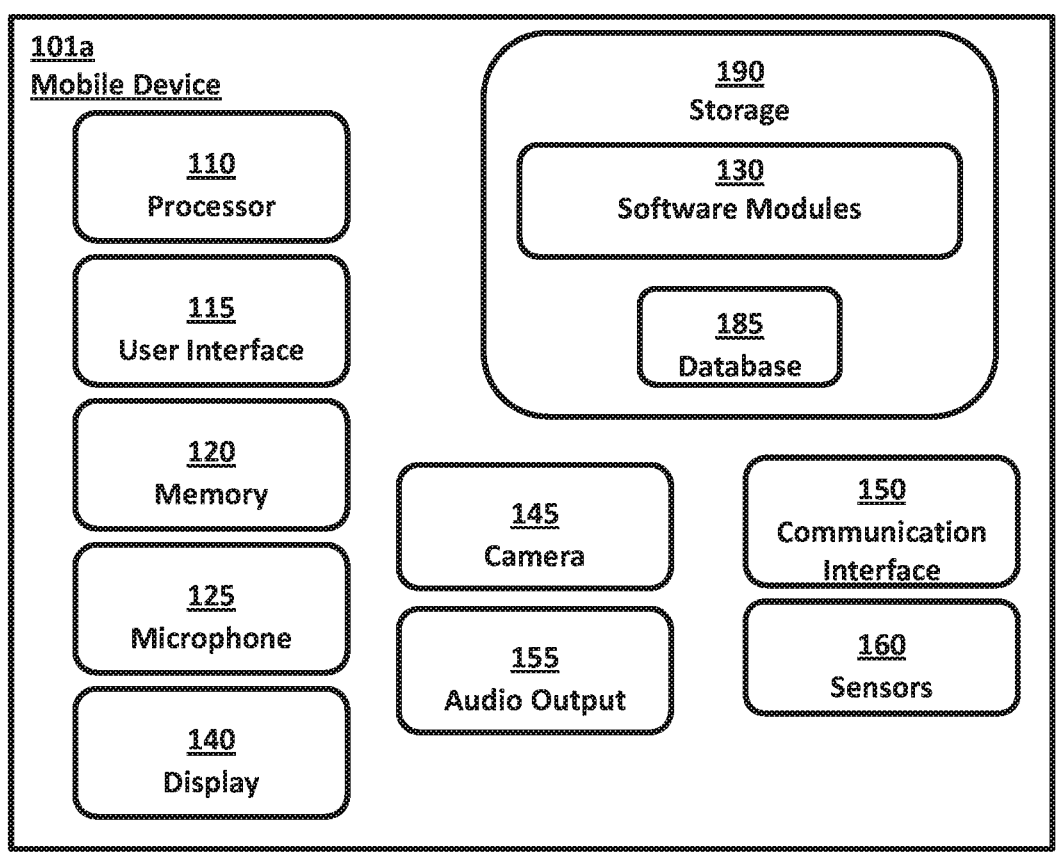
FIG. 2A is a block diagram of a computing device in accordance with at least one embodiment disclosed herein.

In reference to FIG. 2A, the exemplary mobile device 101a for use with the system for authorizing access to an access-controlled environment 100, includes various hardware and software components that serve to enable operation of the system, including one or more processors 110, a memory 120, a microphone 125, a display 140, a camera 145, an audio output 155, a storage 190 and a communication interface 150. Processor 110 serves to execute a client application in the form of software instructions that can be loaded into memory 120. Processor 110 can be a number of processors, a central processing unit CPU, a graphics processing unit GPU, a multi-processor core, or any other type of processor, depending on the particular implementation.

Preferably, the memory 120 and/or the storage 190 are accessible by the processor 110, thereby enabling the processor to receive and execute instructions encoded in the memory and/or on the storage so as to cause the mobile device and its various hardware components to carry out operations for aspects of the systems and methods as will be described in greater detail below. Memory can be, for example, a random access memory (RAM) or any other suitable volatile or non-volatile computer readable storage medium. In addition, the memory can be fixed or removable. The storage 190 can take various forms, depending on the particular implementation. For example, the storage can contain one or more components or devices such as a hard drive, a flash memory, a rewritable optical disk, a rewritable magnetic tape, or some combination of the above. Storage also can be fixed or removable.

Figure 2B:
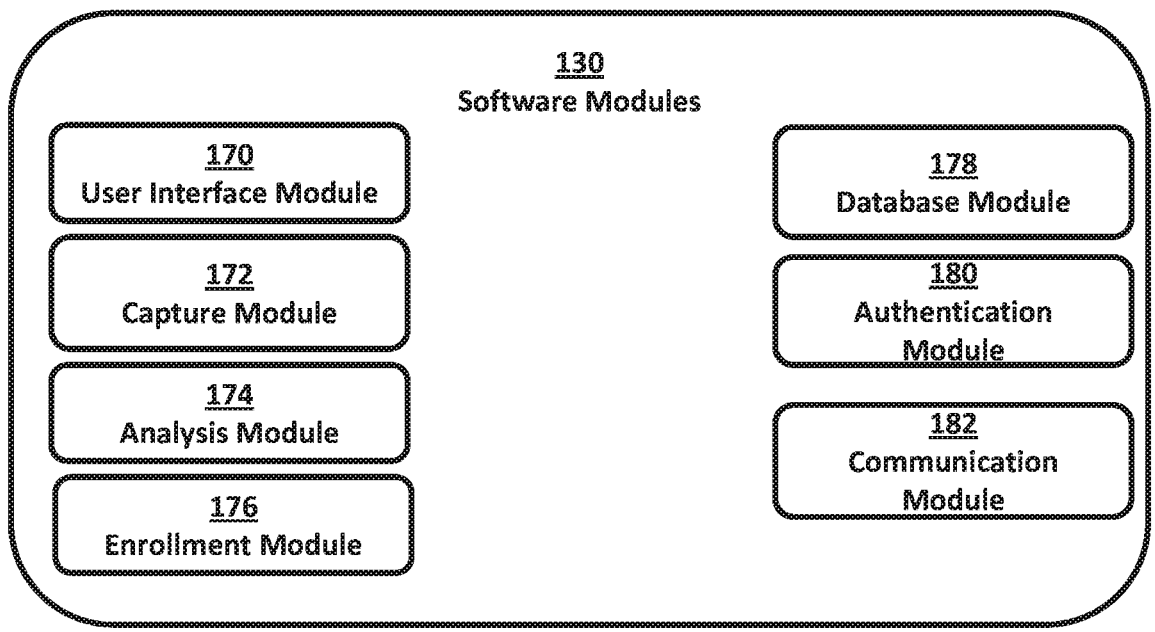
FIG. 2B is a block diagram of computer software modules in accordance with at least one embodiment disclosed herein.

One or more software modules 130 are encoded in the storage 190 and/or in the memory 120. The software modules 130 can comprise one or more software programs or applications having computer program code or a set of instructions (referred to as the "mobile authentication client application") executed in the processor 110. As depicted in FIG. 2B, preferably, included among the software modules 130 is a user interface module 170, a biometric capture module 172, an analysis module 174, an enrollment module 176, a database module 178, an authentication module 180 and a communication module 182 that are executed by processor 110. Such computer program code or instructions configure the processor 110 to carry out operations of the systems and methods disclosed herein and can be written in any combination of one or more programming languages.

The program code can execute entirely on mobile device 101, as a stand-alone software package, partly on mobile device, partly on system server 105, or entirely on system server or another remote computer/device. In the latter scenario, the remote computer can be connected to mobile device 101 through any type of network, including a local area network (LAN) or a wide area network (WAN), mobile communications network, cellular network, or the connection can be made to an external computer (for example, through the Internet using an Internet Service Provider).

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of the software modules 130 can be downloaded over a network to storage 190 from another device or system via communication interface 150 for use within the system authorizing access to an access-controlled environment 100. In addition, it should be noted that other information and/or data relevant to the operation of the present systems and methods (such as database 185) can also be stored on storage. Preferably, such information is stored on an encrypted data-store that is specifically allocated so as to securely store information collected or generated by the processor executing the secure authentication application. Preferably, encryption measures are used to store the information locally on the mobile device storage and transmit information to the system server 105. For example, such data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256.

In addition, data stored on the mobile device 101a and/or system server 105 can be encrypted using a user's biometric information, liveness information, or mobile device information as an encryption key. For example, using a key derivation function one or more secret keys can be generated from unique user information such as biometric information. The key pair is therefore uniquely associated with the user by virtue of being derived from the user's biometric information.

In some implementations, a combination of the foregoing can be used to create a complex unique key for the user that can be encrypted using Elliptic Curve Cryptography, preferably at least 384 bits in length, and stored on the mobile device. In addition, that key can be used to secure the user data stored on the mobile device and/or the system server.

Also preferably stored on storage 190 is database 185. As will be described in greater detail below, the database contains and/or maintains various data items and elements that are utilized throughout the various operations of the system and method for authenticating a user 100. The information stored in database can include but is not limited to a user profile, as will be described in greater detail herein. It should be noted that although database is depicted as being configured locally to mobile device 101a, in certain implementations the database and/or various of the data elements stored therein can, in addition or alternatively, be located remotely (such as on a remote device 102 or system server 105—not shown) and connected to mobile device through a network in a manner known to those of ordinary skill in the art.

A user interface 115 is also operatively connected to the processor. The interface can be one or more input or output device(s) such as switch(es), button(s), key(s), a touchscreen, microphone, etc. as would be understood in the art of electronic computing devices. User Interface serves to facilitate the capture of commands from the user such as an on-off commands or user information and settings related to operation of the system for authenticating a user 100. For example, interface serves to facilitate the capture of certain information from the mobile device 101 such as personal user information for enrolling with the system so as to create a user profile.

The computing device 101a can also include a display 140 which is also operatively connected to processor the processor 110. The display includes a screen or any other such presentation device which enables the system to instruct or otherwise provide feedback to the user regarding the operation of the system for authenticating a user 100. By way of example, the display can be a digital display such as a dot matrix display or other 2-dimensional display.

By way of further example, the interface and the display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the person to interact with the device to enter data, change settings, control functions, etc. So, when the touch screen is touched, user interface communicates this change to processor, and settings can be changed or user entered information can be captured and stored in the memory.

Mobile device 101a also includes a camera 145 capable of capturing digital images. The camera can be one or more imaging devices configured to capture images of at least a portion of the user's body including the user's eyes and/or face while utilizing the mobile device 101a. The camera serves to facilitate the capture of images of the user for the purpose of image analysis by the mobile device processor executing the secure authentication application which includes identifying biometric features for (biometrically) authenticating the user from the images. The mobile device 101a and/or the camera 145 can also include one or more light or signal emitters (not shown) for example, a visible light emitter and/or infra-red light emitter and the like. The camera can be integrated into the mobile device, such as a front-facing camera or rear facing camera that incorporates a sensor, for example and without limitation a CCD or CMOS sensor. Alternatively, the camera can be external to the mobile device 101a. The possible variations of the camera and light emitters would be understood by those skilled in the art. In addition, the mobile device can also include one or more microphones 104 for capturing audio recordings as would be understood by those skilled in the art.

Audio output 155 is also operatively connected to the processor 110. Audio output can be any type of speaker system that is configured to play electronic audio files as would be understood by those skilled in the art. Audio output can be integrated into the mobile device 101 or external to the mobile device 101.

Various hardware devices/sensors 160 are also operatively connected to the processor. The sensors 160 can include: an on-board clock to track time of day, etc.; a GPS enabled device to determine a location of the mobile device; an accelerometer to track the orientation and acceleration of the mobile device; gravity magnetometer; proximity sensors; RF radiation sensors and other such devices as would be understood by those skilled in the art.

Communication interface 150 is also operatively connected to the processor 110 and can be any interface that enables communication between the mobile device 101a and external devices, machines and/or elements including system server 105. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g. using the 802.11 standard) though it should be understood that communication interface can be practically any interface that enables communication to/from the mobile device.

At various points during the operation of the system authorizing access to an access-controlled environment 100, the mobile device 101a can communicate with one or more computing devices, such as system server 105, user computing device 101b and/or remote computing device 102. Such computing devices transmit and/or receive data to/from mobile device 101a, thereby preferably initiating maintaining, and/or enhancing the operation of the system 100, as will be described in greater detail below.

Figure 2C:
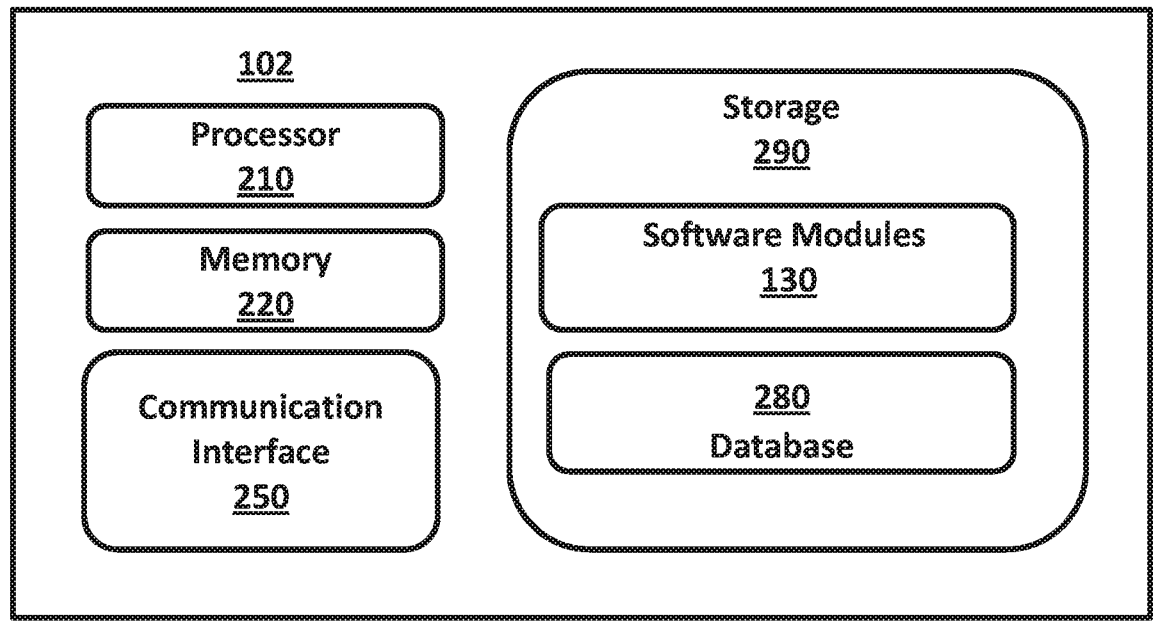
FIG. 2C is a block diagram of a computing device in accordance with at least one embodiment disclosed herein.

FIG. 2C is a block diagram illustrating an exemplary configuration of system server 105. System server 105 can include a processor 210 which is operatively connected to various hardware and software components that serve to enable operation of the system for facilitating secure authentication of transactions at a terminal 100. The processor 210 serves to execute instructions to perform various operations relating to user authentication and transaction processing as will be described in greater detail below. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more software modules 130 (depicted in FIG. 2B) are encoded in the storage 290 and/or in the memory 220. The software modules 130 can comprise one or more software programs or applications (collectively referred to as the "secure authentication server application") having computer program code or a set of instructions executed in the processor 210. Such computer program code or instructions for carrying out operations for aspects of the systems and methods disclosed herein can be written in any combination of one or more programming languages, as would be understood by those skilled in the art. The program code can execute entirely on the system server 105 as a stand-alone software package, partly on the system server 105 and partly on a remote computing device, such as a remote computing device 102, mobile device 101a and/or user computing device 101b, or entirely on such remote computing devices. As depicted in FIG. 2B, preferably, included among the software modules 130 are an analysis module 274, an enrollment module 276, an authentication module 280, a database module 278, and a communication module 282, that are executed by the system server's processor 210.

Also preferably stored on the storage 290 is a database 280. As will be described in greater detail below, the database 280 contains and/or maintains various data items and elements that are utilized throughout the various operations of the system 100, including but not limited to, user profiles as will be described in greater detail herein. It should be noted that although the database 280 is depicted as being configured locally to the computing device 205, in certain implementations the database 280 and/or various of the data elements stored therein can be stored on a computer readable memory or storage medium that is located remotely and connected to the system server 105 through a network (not shown), in a manner known to those of ordinary skill in the art.

A communication interface 255 is also operatively connected to the processor 210. The communication interface 255 can be any interface that enables communication between the system server 105 and external devices, machines and/or elements. In certain implementations, the communication interface 255 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device 205 to other computing devices and/or communication networks, such as private networks and the Internet. Such connections can include a wired connection or a wireless connection (e.g., using the 802.11 standard) though it should be understood that communication interface 255 can be practically any interface that enables communication to/from the processor 210.

Figure 3:
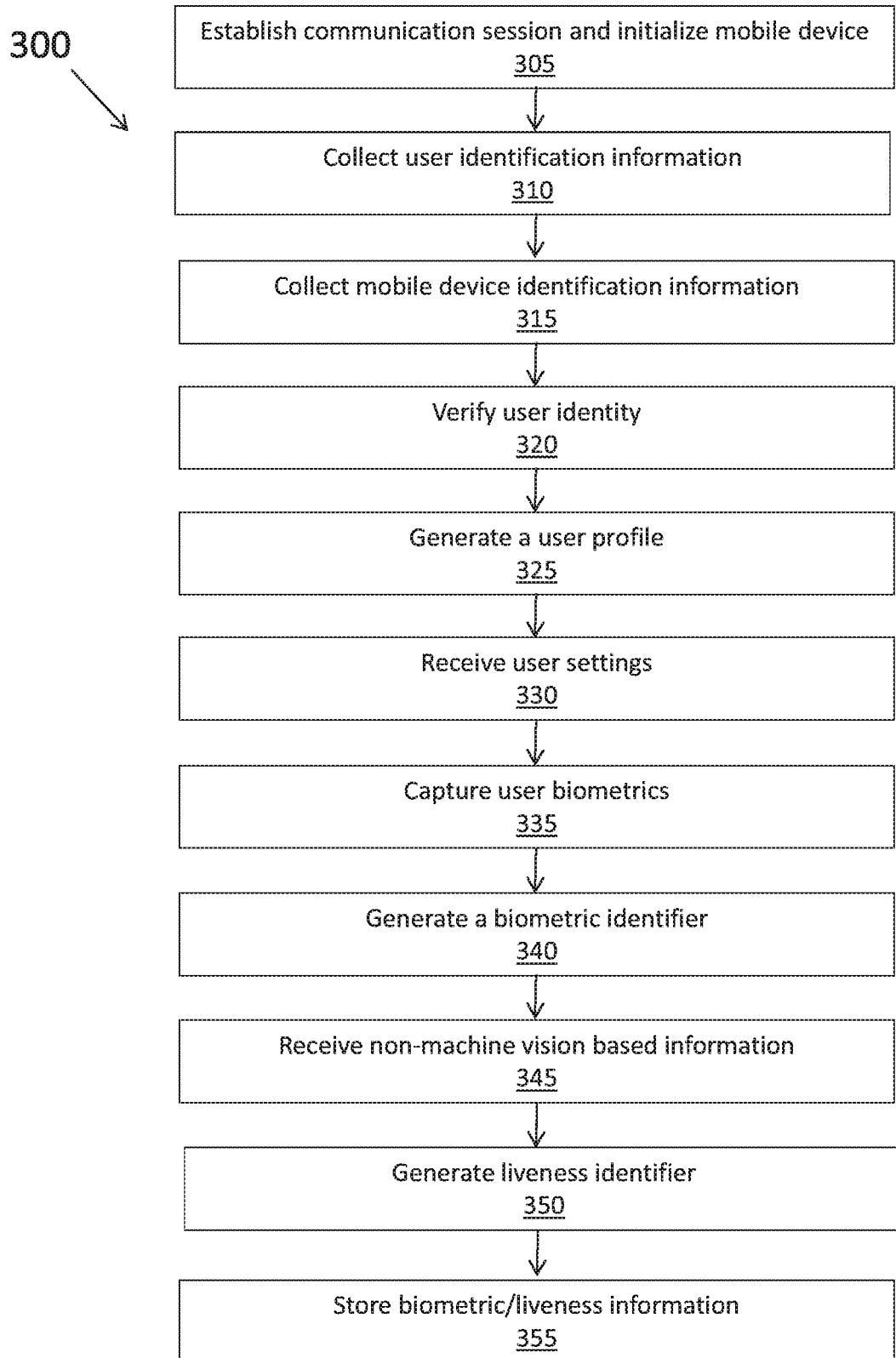
FIG. 3 is a flow diagram showing a routine for enrolling a user according to the user's biometric features in accordance with at least one embodiment disclosed herein.
Figure 4:
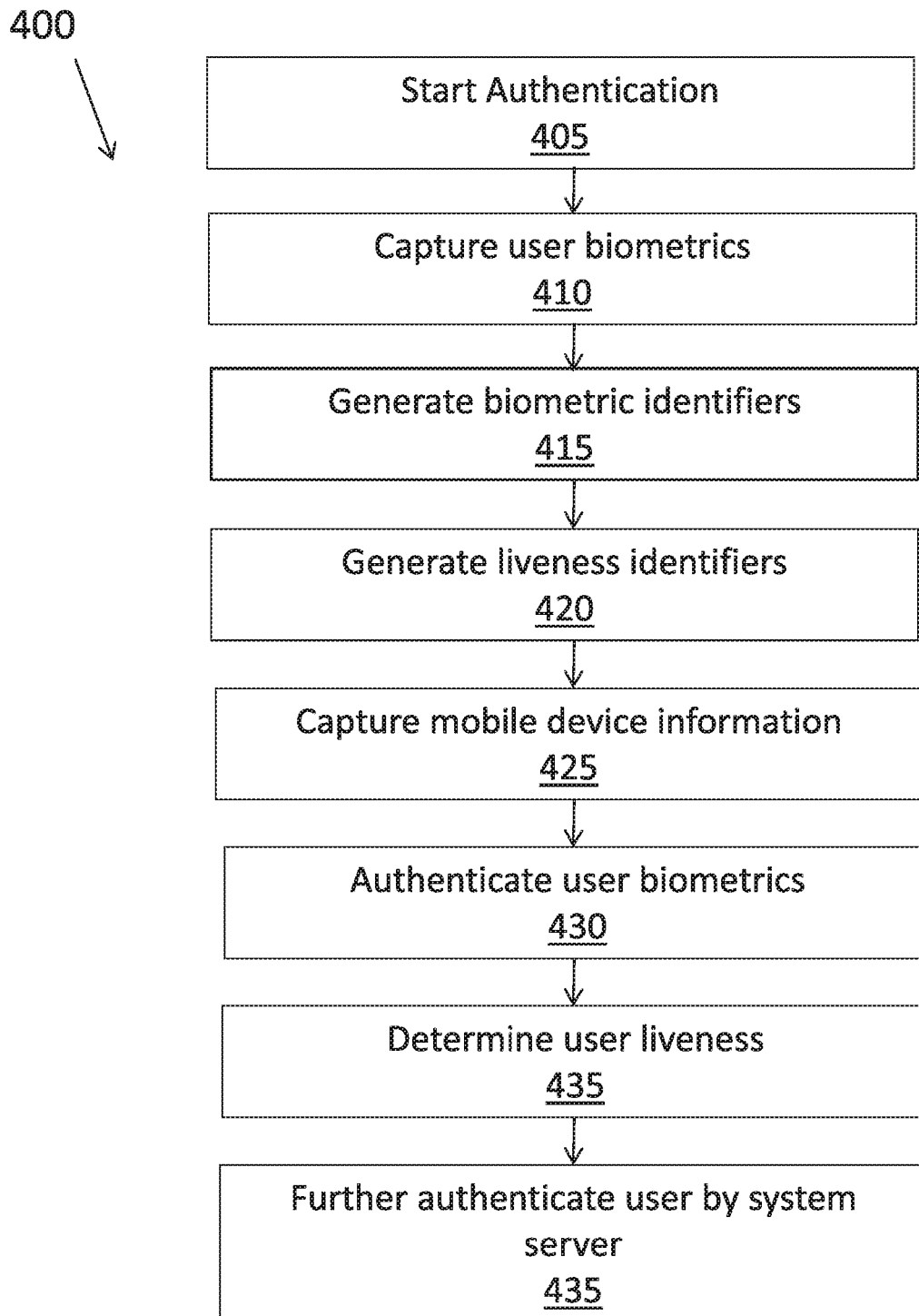
FIG. 4 is a flow diagram showing a routine for authorizing access to an access-controlled environment in accordance with at least one embodiment disclosed herein.

The operation of the system for authorizing access to an access-controlled environment and the various elements and components described above will be further appreciated with reference to the method for authenticating a user as described below, in conjunction with FIGS. 3-4 with continued reference to FIGS. 1 and 2A-2C. The processes depicted in FIGS. 3 and 4 are shown from the perspective of the mobile device 101a as well as the system server 105, however, it should be understood that the processes can be performed, in whole or in part, by the mobile device 101a, the system server 105 and/or other computing devices (e.g., remote computing device 102 and/or user computing device 101b) or any combination of the foregoing. It should be appreciated that more or fewer operations can be performed than shown in the figures and described herein. These operations can also be performed in a different order than those described herein. It should also be understood that one or more of the steps can be performed by the mobile device 101a and/or on other computing devices (e.g. computing device 101b, system server 105 and remote computing device 102).

FIG. 3 is a flow diagram illustrating a routine 400 for enrolling the user 124 with the system 100. The enrollment process verifies the user's identity to ensure that the user is who they say they are and can also specify the manner in which the user 124 and the mobile device 101a are identified to the system server 105. In addition, enrollment can create a user profile which associates the user 124 with user devices (e.g., user's mobile device 101a and/or the user computing device 101b) and with one or more of the user's transaction accounts. Enrollment also includes capturing (e.g., reading) the user's biometrics features, generating one or more biometric identifiers characterizing those features and determining the user's liveness. These steps can be performed for verification as well as to establish a baseline for future verification sessions as further described herein. Accordingly, it can be appreciated that many of the steps discussed in relation to FIG. 3 can be performed during subsequent user authentication sessions as discussed in relation to FIG. 4.

The process begins at step 305, where an initial communication session is established between the mobile device 101a and the system server 105. In some implementations, communications between the mobile device and system server can be established using 2-way Secure Socket Layers (SSL) established on a top of 1-way SSL communication. More specifically, the mobile device processor 110, which is configured by executing one or more software applications, including, preferably, the communication module 182 and the enrollment module 176, can transmit an API call to the system server 105 and establish a 1-way SSL communication session with the system server 105 in order to encrypt the communications. The API call can also include a private 2-way SSL key so as to establish a 2-way SSL secure communication environment. In some implementations, the mobile device can transmit a pre-loaded 2-way SSL certificate and an API key that is unique to the mobile device client application. The pre-loaded certificate and key can be single use instances that are stored when the client application is stored into memory.

In addition, at step 305, the mobile device processor 110, which is configured by executing instructions in the form of one or more software modules 130, including, preferably, the enrollment module 176, the capture module 172, the communication module 182, the database module 178, the analysis module 174, can also initialize the various components of the mobile device 101a and determine their respective operability and capabilities.

Initialization can be performed during the initial enrollment process and can also be performed during subsequent biometric capture/authentication processes. However, it should be understood that some or all of the steps need not be performed with each initialization and can be performed upon initial enrollment and/or periodically thereafter. By way of non-limiting example, user enrollment and initialization of a mobile device to facilitate biometric authentication using a mobile device are described herein and in co-pending and commonly assigned U.S. Patent Application Ser. No. 61/842,800.

Figure 6A:
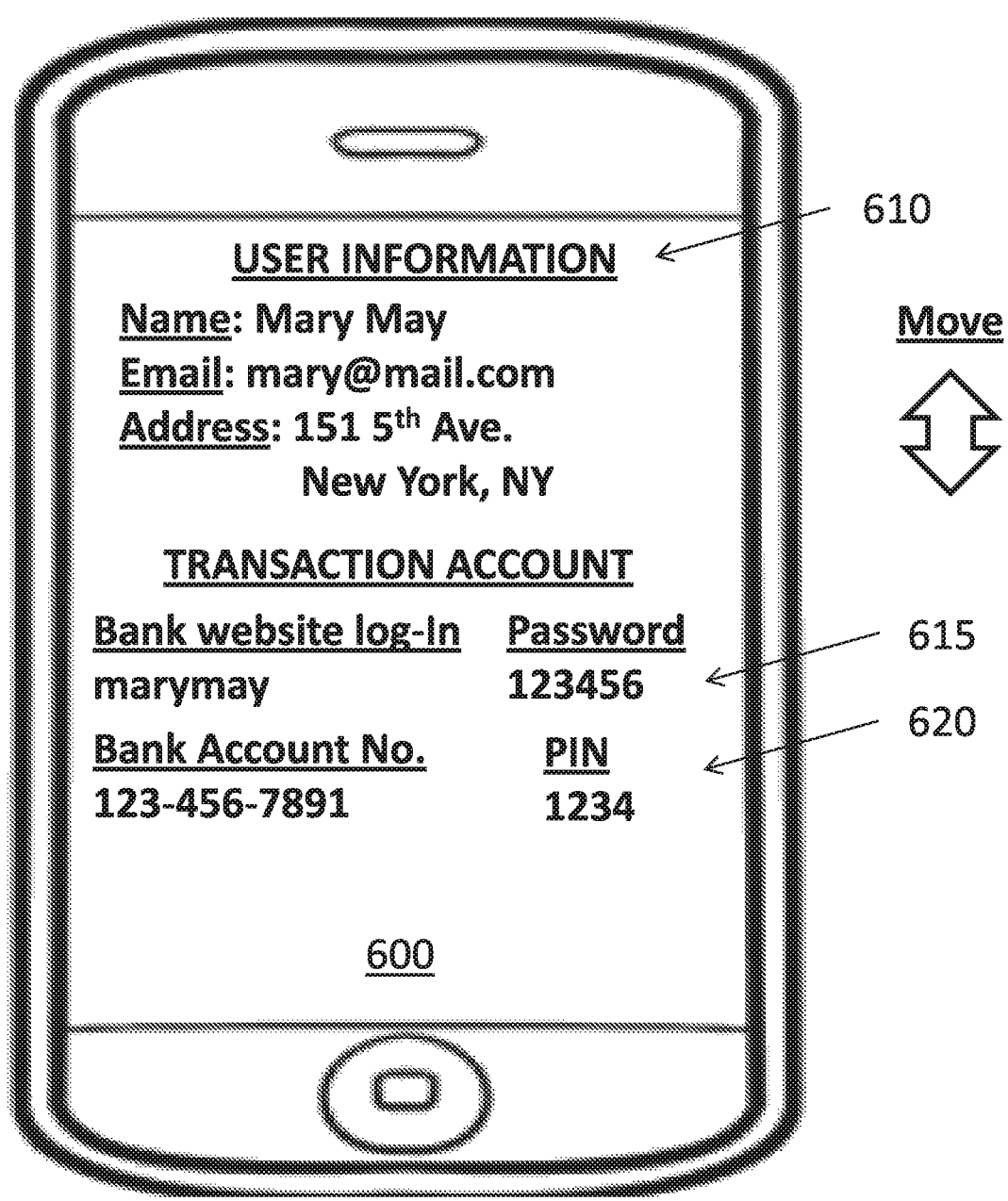
FIG. 6A is a screenshot of an exemplary user interface in accordance with at least one embodiment disclosed herein.

Then at step 310, the mobile device 101a collects user identification information. More specifically, the mobile device processor 110, which is configured by executing one or more software modules 130, including, preferably, the enrollment module 176 and the user interface module 170, can prompt the user to input the user identification information and receive the user inputs via the user interface 115. The user identification information can include information about the user's identity (e.g., name, address, social security number, etc.). For example, as shown in FIG. 6A, the mobile device display 600 can prompt the user to input such personal information about the user's identity 610. In some implementations, some or all of the information can be gathered automatically from memory of the mobile device 101a or from a remote computing device.

In addition, user identification information can include information about one or more transaction accounts with which the user desires to access one or more ACEs according to the systems and methods described herein. For example, the user can enter pre-existing log-in and passwords 615 associated with the user's various transaction accounts (e.g., online banking accounts, website log-ins, VPN accounts and the like) or actual transaction account numbers 620 (e.g., bank account numbers, routing numbers, debit/credit card numbers, expiration dates and the like) as shown in FIG. 6A. In some implementations, the configured mobile device processor and/or the system server 105 can automatically obtain some or all of such information directly from the enterprise organizations associated with the transaction accounts and/or ACEs after verifying the user's identity according to the user identification information provided by the user.

Then at step 315, mobile device identification information is collected. Mobile device identification information can include but is not limited to at least a portion of the DeviceID, AndroidID, IMEI, CPU serial number, GPU serial number and other such identifiers that are unique to the mobile device. More specifically, the mobile device processor 110, which is configured by executing one or more software modules 130, including, preferably, the enrollment module 176, can query the various hardware and software components of the mobile device 101a to obtain respective device identification information. Using the mobile device identification information the configured mobile device processor or the system server can generate one or more mobile device identifiers that uniquely identify the mobile device as further described herein.

Then at step 320, the user's identity is verified. Identity verification provides additional security and determines that the user 124 is, in fact, who they claim to be. It should be understood that verifying the user's identity can be performed by the system server 105, the mobile device 101a, or a combination of the foregoing.

For example and without limitation, the mobile device processor 110, which is configured by executing one or more software modules 130, including, preferably, the enrollment module 176 and communication module 182, can transmit the user identification information can to the system server 105 for identity verification. In some implementations, the system server 105, can query a database storing the user's personal data and determine whether the user information corresponds to the previously stored data. If the compared information does not correspond to a sufficient degree or additional user input is required, the system server can also generate follow up questions that are specific to the user according to the database of personal data and forward the questions to the mobile device 101a thereby prompting the user 124 to input answers to the questions using the mobile device. Various methods of verifying a user's identity would be understood by those in the art.

In addition or alternatively, identity verification can also be performed according to the mobile device information as further described herein. For example, determining, by the system server 105, whether the user information and device information corresponds to the mobile communication service account associated with the mobile device 101a as gathered from the mobile phone service provider's enterprise system.

In some implementations, the system server 105 can verify the user's identity according to transaction account and password information that is already associated with one or more existing transaction accounts associated with the user and stored on the system server or on a secure data store that is accessible by the system server. For example, if the system server is integrated with an existing enterprise security system, the user can be identified by, say, an existing account number and pin number or a log-in and password. In addition or alternatively the user's identity can be verified using third-party verification services, for example, the Acxiom Personal Information Verification System by Acxiom Corp. of Little Rock, Ark.

It should be understood that the stringency of the identity verification can vary depending on the level of security as dictated by the particular implementation of the secure authentication system 100. For example, user log-in to an online forum/discussion board might require only liberal verification of a user's identity, whereas applications in which the disclosed systems and methods are used to authenticate a financial transaction may require stringent identity validation. As such, the identity verification can range from stringent verification using services such as Axciom to simply confirming whether the user log-in and password match an existing log-in and password.

Then at step 325, if a user's identity is verified, a user profile can be generated and stored. The user profile can include one or more pieces of user identification information and mobile device identification. In addition the user profile can include information concerning one or more of the user's transaction accounts as well as settings that can be used to guide the operation of the system 100 according to the user's preferences.

In some implementations, the system server 105 can generate a unique identifier for the user (a "userId") and an associated mobile device identifier (a "mobileId") and store the identifiers in a clustered persistent environment so as to create the profile for the user. The userId and mobileId can be generated using one or more pieces of the user identification information and mobile device identification information, respectively. It should be understood that additional user identification information and mobile device identification information can also be stored to create the user profile or stored in association with the user profile.

In addition, the userId and associated mobileId can be stored in association with information concerning one or more transaction accounts described at step 315. In some implementations, the specific transaction account information can be stored on the system server 105 thereby enabling the system server to authorize all or part of the requested transactions on behalf of the user and the enterprise organization. In addition or alternatively, the user profile can be associated with a transaction account using, for example, an identifier (e.g., a site ID or global unique identifier, etc.) or other such pointer to a secure datastore storing the sensitive transaction account information, say, the remote computing device 102 operated by an enterprise organization. Accordingly, the system server 105 is not required to store sensitive transaction account information, and, as further described herein, the system server 105 can generate and/or forward requests to authorize a user to the appropriate enterprise organization for further processing. In addition or alternatively, the system server can query the secure datastore to gather the necessary information for processing any such requests.

At this juncture, it can be appreciated that the userId can be used to map the user profile to the user's legacy transaction accounts. In addition, the mobileId ties the device to a user profile. In some implementations, the userIds are a convention, whereas, the mobileIds are mandatory because the mobileId alone can link the user 124 and mobile device 101a pair to the user profile maintained by the system server 105 and/or the user's transaction accounts. Moreover, any additional information included in the user profile can be used for non-repudiation or provenance purposes by the system server 105 in future authorization requests.

It can be appreciated that user profiles can be created by the system server 105 and/or the mobile device 101a. Moreover, one or more instances of a user profile can be stored on various devices (e.g., system server 105, mobile device 101a, remote computing device 102, or user computing device 101b). In addition, the information included in the various instances of the user's profiles can vary from device to device. For example, an instance of the user profile which stored on the mobile device 101a can include the userId, mobileId, user identification information and sensitive information concerning the user's transaction accounts, say, account numbers and the like. By way of further example, the instance of the user profile stored by the system server 105 can include the userId, mobileId, other unique identifiers assigned to the user and information that identifies the user's transaction accounts but does not include sensitive account information.

In some implementations, generating the user profile by the system server 105 can also include generating a private key, say, a unique 2-way SSL certificate using the user identification information, which can include the information concerning the user's transaction account(s), and the mobile device identification information. The generated private key can also be transmitted back to the mobile device 101a for storage in the mobile device. Accordingly, the generated key can be used for subsequent communications in conjunction with identity assertion sessions.

For example, the enrollment/genesis phase can link the information that identifies the user (e.g., userId, SSN, email, or other user identifiers) to a Common Name (CN) which can be the particular manner in which the particular user is uniquely identified by the system server 105 and/or legacy transaction account systems in the two way secure socket layers key. Accordingly. the genesis phase can also link legacy transaction accounts associated with the user (e.g., the user's bank account) with the user identity maintained by the system server 105.

The private key is generated on the system server 105 and links the mobile device 101a (e.g., mobileId) and user (e.g., userId) pair to the user identity (e.g., user identifier, common name, etc.) that will be used for subsequent communication.

The identity as asserted through the 2-way Secure Socket Layer key can be maintained for all communication. This key is encoded with a password known to only the device being used during enrollment, which in this example is the mobile device 101a. In addition, the key is programmatically placed in the key store on the mobile device 101a. It is the only mechanism allowing the identity and links to the genesis phases. No human or device knows the password used to encrypt the 2-way SSL key. Accordingly, the mobile device 101a, using the private key, has an identity to offer in subsequent communications. It can be appreciated that each enabled mobile device associated with a user can have a unique key that can be linked to the same user profile enabling the use of multiple devices in the same manner. In addition or alternatively, separate user profiles can be established and maintained for each user-device pair independently or in a linked fashion. It can also be appreciated that, similarly, multiple users can use the same device(s) which correspond to individual user profiles or joint user profiles or otherwise linked user profiles.

Accordingly, as a result of genesis/enrollment, a user profile is created which associates the user 124, the mobile device 101a and one or more transaction accounts. In addition, the mobile device 101a can be provided with information (e.g., a unique user identifier and mobile device identifier and/or unique keys) for identifying the user 124 and mobile device 101a in subsequent communications, say, identity assertion sessions.

Then at step 330, user settings are received. Settings include preferences and rules defined by the user for guiding the operation of the system 100. In some implementations, during the enrollment process or at any point thereafter, the mobile device 101a can prompt the user to input settings and associate those settings with one or more of the user's transaction accounts. The settings can be stored by the mobile device or the system server 105 or a combination of the foregoing. Accordingly, the user defined settings can cause the system 100 to authenticate the user and/or facilitate transactions automatically, or with fewer user inputs.

In some implementations, the user input settings can specify preferred access-controlled environments that the user desires to access using the system. For example, settings can identify certain websites or applications that the user wishes to automatically log-into using the system 100. In some implementations the settings can specify circumstances in which a user desires to authenticate for gaining access to such environments. For example, the user desires to authenticate only when making a purchase through a particular mobile-application, as opposed to authenticating immediately upon launching the particular mobile application.

In some implementations, the user settings can specify preferences for conducting transactions. For example and without limitation, the user can specify default payment methods/accounts thereby configuring the mobile device 101a and/or the system server 105 to select transaction accounts and/or process transactions efficiently. In addition, the user can associate the payment methods with specified merchants. By way of further example, a user can specify rules to control use of certain transaction accounts, say, causing the system server 105 to prevent certain types of transactions, cause a notification to be provided to the user or implement additional security measures to ensure approved account usage.

In some implementations, the user settings can include user defined access rules or privacy settings controlling access to the user's information or activity or accounts. For example, the settings can identify other enrolled users or enterprise organizations that the user desires to have access to the user's accounts or information associated with the user.

In some implementations, the settings can specify default transaction rules for conducting transactions with defined enterprise organizations. For example, settings can specify that the user typically wishes to withdraw a prescribed amount of cash from a default transaction account when conducting an ATM transaction. Accordingly the system 100 can automatically conduct the transaction by applying the user defined settings when a transaction at an ATM is initiated without requiring the user to provide or confirm the transaction account and transaction details.

In some implementations, a user can also set one-time transaction rules in advance of conducting certain electronic transactions. For example, the user can specify that the next time the user accesses a financial institution's network, the user desires to make a $500 payment into the user's account held with the enterprise organization using a particular payment method. In this manner, the user can queue a number of different transactions to be carried out automatically by the system 100.

It should be understood that the described settings are presented as non-limiting examples, and that a wide variety of settings can be used to control the operation of the system 100 and how users interact with the system 100.

It should be also understood that during enrollment and any time thereafter and while using any user devices (e.g., mobile device 101a and user computing device 101b) that are enrolled with the system, the user can adjust settings regarding user's preferences for interacting with the system 100. For example, the mobile device can receive from the user additional user identification information, passwords, transaction account information and the like for storage locally on the mobile device 101a, on the system server 105, the user computing device 101b or a combination of the foregoing. As such, any of the computing devices of the system 100 can be configured to act as a platform for automatically facilitating access to ACEs using such transaction accounts and providing the user's information to the various enabled computing devices (e.g., mobile device 101a, user computing device 101b, remote computing device 102).

Then at step 335, the user's biometrics features are captured using the mobile device 101a. In some implementations, the mobile device processor 110, which is configured by executing one or more software modules 130, including, preferably, the enrollment module 176, the analysis module 174, the user interface module 170, and the capture module 172, prompts the user to capture imagery of the user's iris/irises, eye(s), periocular region, face (e.g., the Vitruvian region) or a combination of the foregoing using the mobile device camera 145 and stores a sequence of images to storage 190 or memory 120.

In some implementations, the configured processor 110 can also cause the microphone 104 to capture the user's voice through a microphone in communication with the mobile device and record the audio data to the device memory. For example, the user can be prompted to say words or phrases which are recorded using the microphone. The mobile device can also capture images of the user's face, eyes, etc. while recording the user's voice, or separately.

Then at step 340, one or more biometric identifiers are generated from the captured biometric information and are stored to complete the enrolment stage. More specifically, the mobile device processor 110, which is configured by executing one or more software modules 130, including, preferably, the capture module 172, the database module 178, the analysis module 174, can analyze the biometric information captured by the camera and generate a biometric identifier (e.g., "a Vitruvian identifier") as further described herein and in reference to FIG. 5.

In some implementations, the user's voice biometric features can be characterized as a voice print such that the user can be biometrically authenticated from characteristics of the user's voice according to voice speaker identification algorithms. For example, the audio component of the user's biometric information can be analyzed by the mobile device processor according to the voice speaker identification algorithms to create a voice print for the user which can be stored by the mobile device. The various technologies used to process voice data, generate and store voice prints can include without limitation, frequency estimation, hidden Markov models, Gaussian mixture models, pattern matching algorithms, neural networks, matrix representation, vector quantization and decision trees. Accordingly, the user can be authenticated/identified or liveness determined by analyzing the characteristics of the user's voice according to known voice speaker identification algorithms as further described herein.

In some implementations, the configured mobile device processor 110 can determine if the biometric information captured is sufficient to generate adequate biometric identifiers. If the biometric features are not identified with sufficient detail from the biometric information captured (e.g., imagery, audio data, etc.), the configured mobile device processor can prompt the user to repeat the biometric capture process via the display or other such output of the mobile device 101a. In addition, the configured mobile device processor 110 can provide feedback during and after capture thereby suggesting an "ideal scenario", for example and without limitation, a location with adequate visible light, the appropriate distance and orientation of the camera relative to the user's face and the like.

Moreover, in some implementations, the configured mobile device processor can analyze the light captured by the camera and the light spectrum that can be emitted by light emitters on the mobile device, and adjust the frequency of the light emitted during the capture step so as to improve the quality of the biometric information captured by the camera. For example, if the configured processor is unable to generate a biometric identifier, and determines that the user has darker colored eyes, the processor can cause the camera to recapture the image data and cause the light emitter to emit light frequencies that are, say, as close to the infra-red spectrum as possible given the particular mobile device's capabilities so as to capture more features of the user's iris.

In addition to generating the one or more biometric identifiers as discussed above, the configured mobile device processor can also generate identifiers incorporating multiple instances of one or more biometric identifiers. For example, during the enrollment process, the configured mobile device processor can capture and analyze multiple sequences of biometric information so as to generate multiple biometric identifiers that, collectively, are adequate virtual representations of user 124 across the multiple captures (e.g., to ensure that the configured processor has "learned" enough biometric information for user 124). Accordingly, the biometric capture portion of the enrollment process can be performed several times at various intervals and locations so as to capture the user's biometric information in various real-world scenarios, thereby increasing the likelihood that future authentication will be positive and without error. It should be understood that the multiple biometric identifiers can be stored separately and/or combined into a single identifier.

In addition or alternatively, complex biometric identifiers can be generated by fusing identifiers generated according to different biometric identification modalities to create a multi-dimensional biometric identifier that is a combined biometric representation of the user. For example, the mobile device processor configured by executing one or more modules including, preferably, the analysis module 174, can combine the user's voice print(s) and the Vitruvian identifier(s).

In some implementations, the biometric identifiers can be stored locally on the mobile device 101a in association with the user's profile such that the mobile device can perform biometric authentication according to the biometric identifiers. In addition or alternatively, the biometric identifiers can be stored in association with the user's profile on a remote computing device (e.g., system server 105 or remote computing device 102) enabling those devices to perform biometric authentication of the user.

At step 345, the mobile device processor 110, which is configured by executing one or more software modules 130, including, preferably, the capture module 172, can also receive non-machine-vision based information. Non-machine-vision based information generally relates to behavioral characteristics of the user 124 during enrollment and subsequent authentication sessions that are indicative of the user's identity as well as the user's liveness. For example and without limitation, non-machine-vision based information can include a time received from an on-board clock, a location received from GPS device, how far from the user's face the camera is positioned during image capture calculated from imagery or other on-board proximity measuring devices, the orientation of the mobile device and acceleration of the mobile device received from an accelerometer, RF radiation detected by an RF detector, gravity magnetometers which detect the Earth's magnetic field to determine the 3-dimensional orientation in which the phone is being held, light sensors which measure light intensity levels and the like.

In some implementations, the non-machine-vision based information is received over time and stored such that the configured processor can determine patterns in the information that are unique to the user 124 by applying behavioral algorithms as would be understood by those in the art. Accordingly, during later authentication stages, the current non-computer-vision based data collected can be analyzed and compared to the user's established behavioral traits to verify the user's identity as well as determine whether the information is indicative of liveness. For example, time and location based behavioral patterns can be identified over time and the current position compared to the pattern to determine if any abnormal behavior is exhibited. By way of further example, the particular "swing" or acceleration of the mobile device during multiple authentication processes can be characterized as a behavioral trait and the particular swing of the current authentication can be compared to identify abnormal behavior. By way of further example, the device orientation or distance from the user's face can also be similarly compared. By way of further example, an RF radiation signature for the user can be established during enrollment and compared to future measurements to identify abnormal RF radiation levels (e.g., suggesting the use of video screens to spoof the system).

At step 350, the mobile device processor configured by executing one or more software modules 130, including, preferably, the analysis module 174, can generate one or more liveness identifiers which characterize the captured user's biometrics and/or the non-machine-vision based information that are indicative of the user's liveness. As noted above, determining liveness is an anti-spoofing measure that can be performed during enrollment and subsequent authentication sessions to ensure that the image sequence captured by the imaging device is of a live subject and not a visual representation of the user by, say, a high resolution video. In some implementations liveness is determined by detecting movement of biometric features because every time the user enrolls or validates the user will actually move a little no matter how steady he/she is trying to be.

Figure 5:
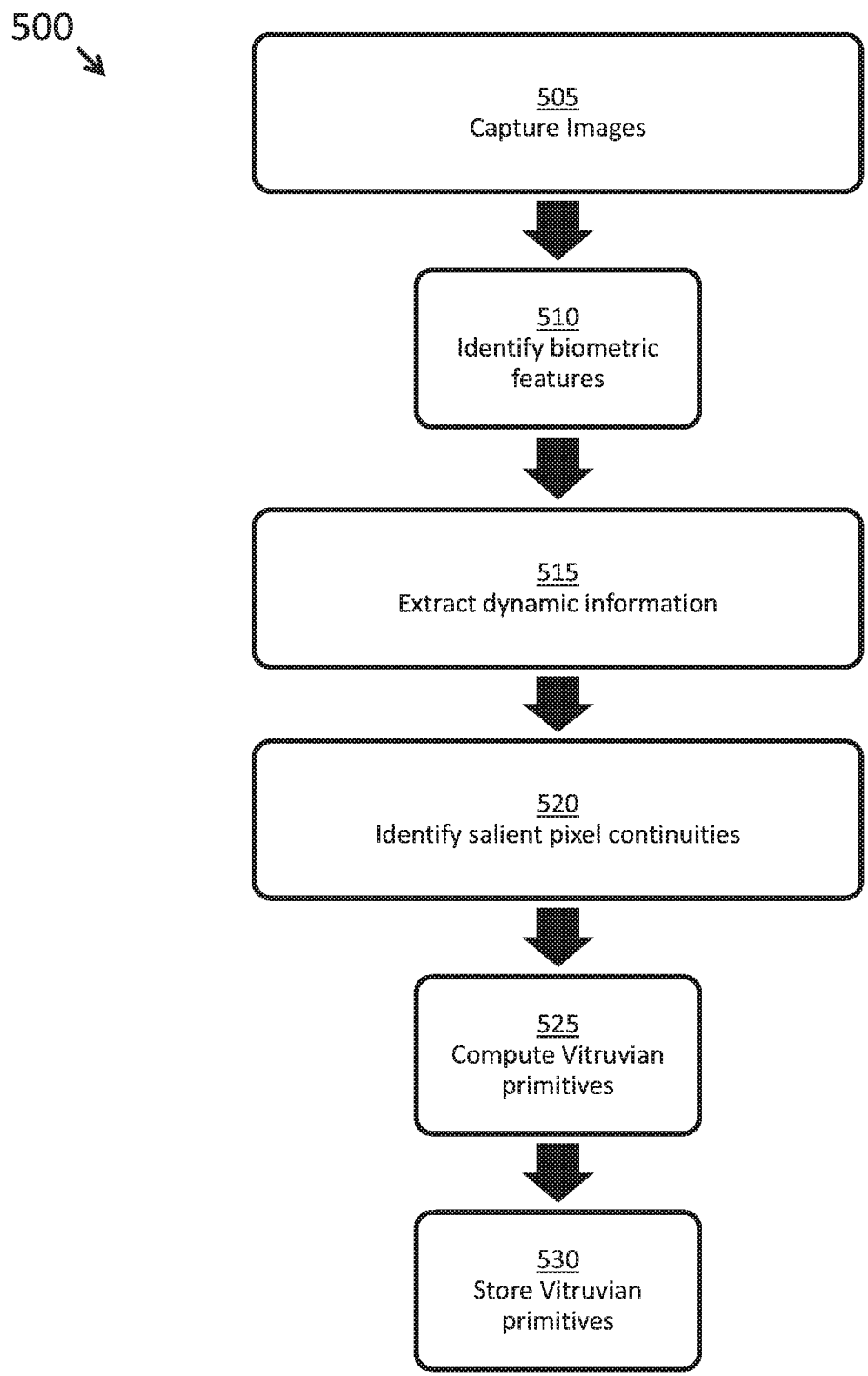
FIG. 5 is a flow diagram showing a routine for authenticating a user according to the user's biometric features in accordance with at least one embodiment disclosed herein.

In some implementations, the process for generating biometric identifiers, as discussed at step 335 and process 500 of FIG. 5, can used to generate a liveness identifier and/or determine the user's liveness. More specifically, the configured mobile device processor, employing the steps of process 500, can extract and record dynamic information of Vitruvian biometric features and encode the features as a biometric identifier that is indicative of liveness and/or as a unique liveness identifier. In addition, it should be understood that the configured processor can analyze the dynamic information to identify fluid motion of the features within the image sequence that are indicative liveness. More particularly, liveness can be determined from analysis of the dynamic movement of low-level Vitruvian features to determine if the flow is representative of continuous motion. Similarly, liveness can also be determined by the movement of intermediate level features such as the eyes, mouth, and other portions of the face.

In addition or alternatively, the configured processor can generate a liveness identifier and/or determine liveness according to the Eulerian motion magnification algorithms which is also referred to as Eulerian video magnification (EMM or EVM). EMM can be used to amplify small motions of the subject captured in the images, for example, flushing of the subject's skin during a heartbeat. In some implementations, when employing EMM, the camera (e.g., the smartphone camera) and the subject are still, however, the configured processor can use EMM to detect these small motions of the subject even while the device is moving using video stabilization.

In some implementations, a liveness identifier can be generated and/or liveness determined, by analyzing lip movement, pupil dilation, blinking, and head movement throughout the image sequence. Moreover, a liveness identifier can also be generated and liveness determined by analyzing the audio recording of the user voice, as would be understood by those skilled in the art. Moreover, in some implementations, liveness can also be determined from analyzing the light values associated with low level, intermediate and/or high level features represented in a single image and/or throughout multiple image frames in the sequence to determine abnormal light intensities in the frame(s).

In addition, the non-machine-vision based information including, time received from an on-board clock, location received from a gps device, how far from the user's face the camera is positioned during image capture as calculated from imagery received from the camera or other on-board distance measuring device, the mobile device orientation during feature acquisition, acceleration of the mobile device while the mobile device is drawn into position for acquisition as received from an accelerometer can all be used to generate an identifier characterizing the user's unique behavioral characteristics and/or analyzed to determine if the information is indicative of liveness during enrollment and authentication sessions.

It should be understood that one or more liveness identifiers generated according to the image based and non-machine-vision based methods can be analyzed and stored individually or combined to generate one or more multi-dimensional biometric and/or liveness identifiers.

Then at step 355, the one or more biometric identifiers and one or more liveness identifiers are stored. In some implementations, the mobile device processor, which is configured by executing one or more software modules 130, including, preferably, the enrollment module 176 and the database module 178, can store the biometric identifiers and liveness identifiers locally, so as to perform biometric authentication on the mobile device 101*a*, thereby avoiding transmission of the sensitive biometric information to the system server for storage.

In some implementations, the configured mobile device processor can transmit the biometric identifiers, liveness identifiers and other information (e.g., a generated mobileId) to the system server 105 as one or more data packets, for example, as described in co-pending and commonly assigned U.S. Patent Application Ser. No. 61/842,800, entitled "SYSTEM AND METHOD FOR PROVIDING BIOMETRICALLY AUTHENTICATED ACCESS USING MOBILE DEVICES" filed Jul. 3, 2013. It should be understood that additional user and mobile device specific information (e.g., user identification information), can also be transmitted to the system server so as to associate the one or more liveness identifiers, biometric identifiers and mobile device identifiers with a particular user.

It should be understood that some or all of the enrollment process steps can be repeated using other user devices, e.g., user computing device 101*b*. For example, a unique mobileId can be generated for other user devices used in conjunction with the system 100, thereby enabling user authorization using multiple enrolled user devices.

Turning now to FIG. 4, which is a flow diagram that illustrates a routine 400 for authorizing a user to access an ACE in accordance with at least one embodiment disclosed herein.

Figure 6B:
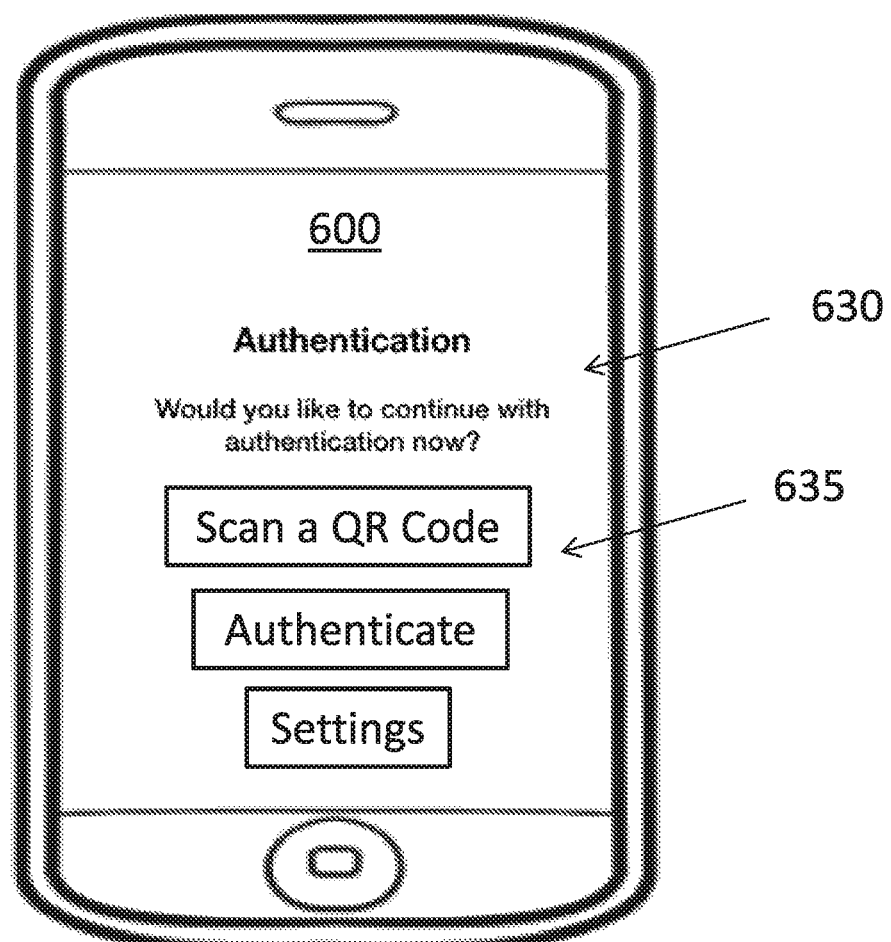
FIG. 6B is a screenshot of an exemplary user interface in accordance with at least one embodiment disclosed herein.

The process begins at step 405 where the mobile device 101a is prompted to authenticate the user 124. In some implementations, the mobile device is prompted to authenticate by receiving a user input. For example, the user can launch the secure authentication client application which displays a prompt 630 on the touchscreen 600 of the mobile device requesting the user to input whether they would like to authenticate using virtual buttons 635, as shown in FIG. 6B. In some implementations, the mobile device 101a can begin the authentication process automatically. For example, the mobile device can prompt the user to authenticate upon detecting that the user has used the mobile device to access an ACE requiring user authorization as specified by the user settings or by the enterprise organization that operates the ACE.

In some implementations, the system server 105 can cause the mobile device 101a to begin authentication in response to receiving an authorization request. Preferably, the authorization request includes access-control information that identifies the ACE. In addition, the authorization request, preferably, identifies the user 124 and or an associated user computing device thereby enabling the system server 105 to cause the appropriate user's mobile device to commence authentication. More specifically, in response to the authorization request, the system server 105 can cross-reference the user and/or computing device identified in the request with database of user profiles to determine whether the user or device is associated with a user profile and, hence, is enrolled with the system. Likewise, the system server can determine whether the user profile identifies an enrolled mobile device and transmit a biometric authentication request to the identified mobile device thereby prompting the mobile device to biometrically authenticate the user.

By way of example and without limitation, the authorization request can be received by the system server directly from a remote computing device 102 that controls access to the ACE (e.g., a financial institution computing system, a networked computing device that controls an electronic door lock providing access to a restricted location, a web-server that requires user authentication prior to allowing the user to access a website). By way of further example, the request for authentication can be received by the system server 105 from a user computing device (e.g., computing device 101b) that is being used to gain access to a networked environment. In this example, the user computing device 101b can act as the intermediary to the ACE back-end server by transmitting the authorization request to the system server 105, receiving responses from the system server and relaying information to the ACE server so as to facilitate access to the ACE. In addition or alternatively, the system server can communicate directly with the ACE back-end servers in accordance with the disclosed embodiments.

Then at step 410, the mobile device processor 110, which is configured by executing one or more software modules, including, the authentication module 180, the user interface module 170, the analysis module 174 and the capture module 172, captures the user's current biometric information. In addition, the configured processor can also capture current non-machine-vision based information as well as current mobile device identification information. The capture of such information can be performed by the mobile device in the manner described in relation to steps 315, 335 and 345 of FIG. 3 and as further described herein in relation to FIG. 5.

Then at step 415, the mobile device processor 110, which is configured by executing one or more software modules, including, the authentication module 180 and the analysis module 174, generates one or more current biometric identifiers in the manner described in relation to steps 340 of FIG. 3 and as further described herein in relation to FIG. 5.

Then at step 420, the mobile device processor 110, which is configured by executing one or more software modules, including, the authentication module 180, the user interface module 170, the analysis module 174, can generate one or more current liveness identifiers using the current biometric information and/or current non-machine-vision based information in the manner described in relation to steps 335-350 of FIG. 3 and as further described herein in relation to FIG. 5.

In addition, at step 425, the mobile device processor 110, which is configured by executing one or more software modules, including, the authentication module 180, the user interface module 170, the capture module 172 and the analysis module 174, can extract the mobile device identification information that is currently associated with the mobile device 101a and generate a current mobile identifier substantially in the same manner as described in relation to steps 315 and 325 of FIG. 3. It should be understood that such information and a mobile device identifier need not be generated with each authentication session. In some implementations, a previously generated identifier, say, the mobileId generated during initial enrollment, can be used to identify the mobile device.

Then at step 430, the user is authenticated according to at least a portion of the one or more current biometric identifiers. Using the current biometric identifiers, the user's identity can be authenticated by comparing the biometric identifiers to one or more stored biometric identifiers that were previously generated during the enrollment process or subsequent authentication sessions. It should be understood that the biometric authentication step is not limited to using the exemplary Vitruvian biometric identifiers and can utilize any number of other biometric identifiers generated according to various biometric identification modalities (e.g., iris, face, voice, fingerprint, and the like).

In some implementations, the mobile device processor, configured by executing one or more software modules 130, including, preferably, the authentication module, authenticates the user 124 by matching at least a portion of the one or more current biometric identifiers generated at step 515 to the previously generated version(s) and determining whether they match to a requisite degree. For example, the configured mobile device processor can apply a matching algorithm to compare at least a portion of the current biometric identifiers to the stored versions and determine if they match to a prescribed degree. More specifically, in an exemplary matching algorithm, the process of finding frame-to-frame (e.g., current identifier to stored identifier) correspondences can be formulated as the search of the nearest neighbor from one set of descriptors for every element of another set. Such algorithms can include but not limited to the brute-force matcher and Flann-based matcher.

The brute-force matcher looks for each descriptor in the first set and the closest descriptor in the second set by comparing each descriptor (e.g., exhaustive search). The Flann-based matcher uses the fast approximate nearest neighbor search algorithm to find correspondences. The result of descriptor matching is a list of correspondences between two sets of descriptors. The first set of descriptors is generally referred to as the train set because it corresponds to a pattern data (e.g., the stored one or more biometric identifiers). The second set is called the query set as it belongs to the "image" where we will be looking for the pattern (e.g., the current biometric identifiers). The more correct matches found (e.g., the more patterns to "image" correspondences exist) the more chances are that the pattern is present on the "image." To increase the matching speed, the configured processor can train a matcher either before or by calling the match function. The training stage can be used to optimize the performance of the Flann-based matcher. For this, the configured processor can build index trees for train descriptors. And this will increase the matching speed for large data sets. For brute-force matcher, generally, it can store the train descriptors in the internal fields.

In addition, at step 435, the user is further authenticated by verifying the user's liveness. In some implementations, liveness of the user can be determined by comparing at least a portion of the one or more current liveness identifiers generated at step 420 with the previously generated versions and determining whether they match to a requisite degree. As noted above, verifying the user's liveness can also include analyzing the captured biometric and non-machine-vision information and/or the liveness identifier(s) to determine whether they exhibit characteristics of a live subject to a prescribed certainty. In some implementations, the configured processor 110 can analyze the dynamic information encoded in the liveness identifier to determine if the information exhibits fluid motion of the biometric features within the image sequence that are indicative of a living subject. More particularly, liveness can be determined from analysis of the dynamic movement of low-level Vitruvian features to determine if the flow is representative of continuous motion. Similarly, liveness can also be determined by the movement of intermediate level features such as the eyes, mouth, and other portions of the face. Similarly, liveness can be determined by comparing the movement of the user's intermediate level features with one or more other biometric characterizations of the user to determine if they correspond. For example, the user's lip movements can be compared to the user's voice print to determine whether the lip movement corresponds to the words spoken by the user during the capture process at step 410.

Whether liveness is determined by matching liveness identifiers according to a matching algorithm or by analyzing the information captured at step 410 or liveness identifiers generated at step 420 for indicators of liveness can be dependent on environmental constraints, for example, lighting. More specifically, if the biometric information is captured in poor lighting conditions, liveness can be determined using matching algorithms. Alternatively, if the biometric information is captured under adequate lighting conditions, liveness can be determined by analyzing the captured information and/or the generated identifiers which characterize the biometric information.

Moreover, the current non-computer-vision based information collected at step 410 can also be analyzed and compared to the user's established behavioral traits to determine whether they match to a prescribed degree. For example, time and location based behavioral patterns can be identified over time and the current position compared to the pattern to determine if any differences (e.g., abnormal behavior) are exhibited. By way of further example, the particular "swing" or acceleration of the mobile device during multiple authentication processes can be characterized as a behavioral trait and the particular swing of the device during the current authentication session can be compared to identify abnormal behavior. Similarly, the device orientation or distance from the user's face can also be compared. It should be understood that this analysis can be performed to determine liveness as well as to authenticate the user's identity in connection with step 435. Exemplary systems and methods for determining liveness are further described herein and in co-pending and commonly assigned U.S. patent application Ser. No. 14/201,462, entitled "SYSTEMS AND METHODS FOR DETERMINING LIVENESS" filed Mar. 7, 2014.

Then, at step 440, the user is authorized by the system server 105. Authorization can include verifying that an enrolled user who has been biometrically authenticated using an enrolled mobile device is attempting to access the ACE.

In some implementations, the mobile device processor 110, which is configured by executing one or more software modules 130, including preferably, the authentication module 180 and the communication module 182, can generate at least one transaction request and transmit the transaction request to the system server 105. For example and without limitation, the transaction request can include: information identifying the user (e.g., user identification information or a user identifier generated during authentication or enrollment); information identifying the mobile device (e.g., mobile device identification or a mobile device identifier generated during authentication or enrollment); information indicating whether the user has been biometrically authenticated; and information concerning the ACE that the user is attempting to access.

In some implementations, the transaction request can include a private 2-way SSL key generated during the enrollment process and that establishes a 2-way SSL secured communication session between the mobile device 101a and the system server 105. The key can include information identifying the user and mobile device, for example, a user identifier and a mobile device identifier. In addition or alternatively, the key can include information that is useable to identify the user-mobile device pair. It should be understood that the transaction request and/or the information included in the transaction request(s) can be transmitted as a number of separate transmissions. Similarly, the processing of the request as further described at step 445 can be performed in any number of steps by the mobile device 101a, or the system server 105, or the remote computing device 102, or a combination of the foregoing.

In response to receipt of the transaction request, the system server 105, using a processor 210 which is configured by executing one or more software modules 130, can process the transaction request to authorize the user to access the ACE. For example, the system server can cross-reference the user identified in the transaction request with a database of user profiles to determine whether the user is associated with a user profile and, hence, is enrolled with the system 100. Likewise, the system server can determine whether the mobile device identified by the request is also associated with the user profile. In some implementations, the user can be authorized by comparing the received key to one or more keys stored in association with respective user profiles to identify a match, thereby verifying that the user and/or mobile device identified by the key corresponds to a user profile stored in the database.

In addition, the step of authorizing the user can also include determining, by the system server, whether the transaction request indicates that the user has been biometrically authenticated. In some implementations, verifying biometric authentication can include determining whether the transaction request conforms to a predetermined configuration. For example, the transaction request can be generated by the mobile device only upon successful biometric authentication of the user by the mobile device. Accordingly, receipt of the transaction request provides confirmation that the user has been biometrically authenticated. By way of further example, the transaction request can be generated to include the key that is useable to identify the user and/or mobile device only upon successful biometric authentication. By way of further example, the transaction request can include additional indicators, flags, session information and the like which indicate that the user has been biometrically authenticated and can also provide additional security to the authenticity of the transmission.

Similarly, it should be understood that as all transmissions to and from the various computing devices (e.g., mobile device 101a, user computing device 101b system server 105, and remote computing device 102) can be time stamped and time sensitive and/or include communication session information. As such, the authorization process can also be contingent upon authentication occurring within a pre-defined duration or "time to live" from the time-stamp of each packet of data being sent to the system server. In the event of a malformed or MITM (man in the middle) type assault, where a packet was redesigned, the time-to-live provides additional security since it would be challenging to rebuild a new packet with correct data within the amount of time the TTL is set to.

Authorization can also include determining, by the system server 105, whether the user has permission to access the ACE and/or conduct a transaction (e.g., access a secure website or perform a financial transaction, or access stored information etc.). Preferably, during the authorization process, the system server 105 receives access-control information identifying the ACE. For example, in the scenario where the mobile device automatically initiates authentication upon detecting that the user is attempting to access an ACE, the transaction request can include the access-control information identifying the ACE. By way of further example, if an authorization request is received from the system server from a remote computing device associated with an ACE, the authorization request can include the access-control information. Based on the ACE identified in the access-control information, the system server 105 can determine whether the user's profile identifies one or more transaction account(s) that are useable to access the ACE.

In some implementations, the transaction request, the authorization request and/or the access-control information received by the system server 105 can include transaction details describing the nature of the requested user access and/or a particular transaction to be conducted between the user and the ACE. Accordingly, user authorization by the system server 105 can include further authorizing access and/or authorizing the particular transaction. More specifically, the system server 105 can query one or more defined data stores to gather any access rules (e.g., access permissions, roles, settings etc.) associated with one or more of the user's transaction accounts and which govern access using the one or more transaction accounts. Likewise, the system server can also gather access rules which govern access to the ACE. Based on the so gathered access rules and transaction details, the system server can determine whether the user is authorized to access the ACE and/or perform the requested transaction.

Then at step 445, an authorization notification is generated according to whether the user is authorized to access the ACE at step 440. In some implementation, the system server 105 can transmit the authorization notification directly to the ACE that the user is attempting to access or indirectly via one or more computing devices being used by the user to access the ACE (e.g., mobile device 101a or user computing device 101b). For example, the authorization notification can be transmitted to a remote computing device 102 that controls access to the ACE and therefore requires the user authorization (e.g., a networked computing device that controls an electronic door lock providing access to a restricted location, a server that requires user authorization prior to allowing the user to access a private website or a secure data-store, a ATM terminal requiring authorization prior to dispensing funds). By way of further example, the authorization notification can be transmitted to the mobile device 101a or the user computing device 101b with which the user is attempting to gain access to an ACE using a transaction account. Based on the authorization notification, any such remote computing device which receives the authorization notification can grant access to the user and/or further authorize the user to access the ACE and/or process the requested transaction.

The substance and form of the authorization notification can vary depending on the particular implementation of the system 100. For example, in the case of user attempting to access a website, the notification can simply identify the user and indicate that the user been biometrically authenticated and the user's identity has been authorized/verified. In addition or alternatively, the notification can include information concerning one or more transaction accounts, say, the user's log-in and password information or a one-time password. In other instances, say, when user is trying to complete a financial transaction, the notification can include the user's payment data, transaction details and the like. In some implementations, the authorization notification can include a fused key, which is a one-time authorization password that is fused with one or more biometric, user, mobile device, or liveness identifiers, user identification information and/or mobile device identification information, and the like. In such an implementation, the computing device receiving the authorization notification can un-fuse the one time password according to corresponding identifiers previously stored by the remote computing device and utilize the encoded information to grant access to the user.

Turning now to FIG. 5, a flow diagram illustrates a routine 500 for detecting the user's biometric features from a series of images in accordance with at least one embodiment disclosed herein and generating a biometric identifier for the purposes of authenticating a user and/or determining the user's liveness. In general, the routine includes capturing and analyzing one or more images, preferably an image sequence, of at least the user's eyes, periocular region and surrounding facial region (collectively referred to as the facial region or the Vitruvian region); identifying low-level spatiotemporal features from at least the eyes and periocular regions for the purposes of generating an identifier that compresses the low-level spatiotemporal features (the Vitruvian biometric identifier). As compared to high level features, which generally characterize the overall image frame (e.g., the entire picture of the user's facial region), or intermediate features, which characterize objects within the greater image frames (e.g., the nose), low-level features are frequently used to represent image characteristics and in this case biometric characteristics. Low-level features are preferable in that they are robust for image characterization in that they provide invariance under rotation, size, illuminosity, scale and the like.

The inclusion of the periocular region in generating a biometric identifier can be beneficial in that in images where the iris features alone cannot be reliably obtained (or used), the surrounding skin region may be used to characterize the user's biometric features which can be used to effectively confirm or refute an identity. Moreover, the use of the periocular region represents a balance between using the entire face region and using only the iris for recognition. When the entire face is imaged from a distance, the iris information is typically of low resolution and the extraction of biometric features from the iris modality alone will be poor.

Furthermore, the collective aggregation of low-level periocular features effectively generates a Vitruvian identifier characterizing higher level features, e.g., intermediate level features. The periocular region can be considered to be an intermediate level feature with high performance when it comes to classification of the subject, because, in general, the periocular region provides a high concentration of unique features from which a user can be classified (biometrically).

It should be understood that, according to the disclosed embodiments, the images can be captured and the biometric identifier that is indicative of the user's identity and/or liveness can be generated using mobile devices (e.g. smartphones) that are widely available and having digital cameras capable of capturing images of the Vitruvian region in the visible spectral bands. However, it should be understood that the disclosed systems and methods can be implemented using computing devices equipped with multispectral image acquisition devices that can image in both the visible and near-IR spectral bands. Such multispectral image acquisition user devices can facilitate capturing the iris texture and the periocular texture.

The process begins at step 505, where the mobile device processor 110 configured by executing one or more software modules 130, including, preferably, the capture module 172, causes the camera 145 to capture an image sequence of at least a portion of the user's (124) Vitruvian region and stores the image sequence in memory. Capturing the image sequence includes detecting, by the mobile device camera 145, light reflected off a portion of the user's Vitruvian region. Preferably, the portion of the user's Vitruvian region includes the user's iris/irises, eye(s), periocular region, face or a combination of the foregoing. In addition, the configured processor can cause the mobile device to emit light, at least in the visible spectrum, to improve the intensity of the reflection captured by the camera. In addition, although not required, the mobile device can also be configured to emit infra-red light to augment the spectrum of reflected light that is captured by the camera. It should be understood that the image sequence includes a plurality of image frames that are captured in sequence over a period of time.

Then at step 510, a first image frame is analyzed and low-level features are identified and their relative positions recorded. More specifically, the mobile device processor 110 configured by executing the software modules 130, including, preferably, the analysis module 172, analyzes a first individual image frame to extract/detect spatial information of the low-level Vitruvian biometric features including, preferably, periocular features. The configured processor can detect the features or "keypoints" by executing a keypoint detection algorithm including but not limited to, SIFT, SURF, FREAK, Binary features, Dense SIFT, ORB or other such algorithms whether known in the art or new. The configured processor encodes each of the keypoints detected using the pixel values (e.g., how bright and what color the pixel is) that correspond to the identified keypoint thereby defining a local key descriptor. These low-level features generally range from 3 to approximately 100 pixels in size, however it should be understood that low-level features are not limited to falling within the aforementioned range. Similar to most image algorithm's descriptors (SIFT, SURF, FREAK, etc.), the set of pixels does not necessarily represent a square area. Each feature's computation entails thorough histogram estimations that are taken, for example, over 16×16 regions. It should be understood that the size of the histogram or region can be considered to represent the strength of the feature and is a non-linear function of pixels (e.g. it is not necessarily a function of image quality).

Then at step 515, a continuous series of subsequent frames are analyzed and spatial and/or dynamic information of the keypoints identified at step 510 is extracted. Using the keypoint descriptors encoded/generated at step 510, the mobile device processor 110, which is configured by executing the software modules 130, including, preferably, the analysis module 172, analyzes a plurality of subsequent frames to identify the corresponding keypoints in each of the subsequent images in the sequence of images. More specifically, the pixels defining the local keypoint descriptors are detected in the subsequent image frames and spatial and dynamic information for the detected pixels is extracted. Such dynamic information includes the relative movement of the pixels throughout the series of pixel image frames. For example, the configured processor can analyze the next, say, 5-10 frames in the image sequence by applying an algorithm (e.g. Lukas Kanade or Brox algorithms and the like) to detect the pixels corresponding to the keypoints in each of the images in the sequence. The configured processor can track the position of a sparse or dense sample set of pixels throughout the frames and record the positions.

The relative position (e.g. movement) of a pixel from one image frame to another is referred to as the "optical flow displacement" or "flow". It should be understood that the optical flow displacement can also be sampled using other multi-frame, recursive analysis methods.

The configured processor can quantize the total amount of points by populating them spatially and temporally in histogram bins that can be encoded in the memory of the mobile device. Wherein each bin represents how much 'optical flow' and spatial 'gradients' exist in the clusters of pixels associated with a particular keypoint descriptor.

Preferably, the configured processor can populate the histograms, according to algorithms, including but not limited to, HOOF, HOG or SIFT and the like. Accordingly, the paths can be defined as histograms of oriented gradients (temporal or spatial) and histograms of oriented flows.

Temporal gradients represent the change in position over time (direction, magnitude, time between the image frames) e.g., flow of a pixel or pixels. For example, a pixel intensity identified in the first image frame that is then identified at another pixel location in a second image frame in the sequence, can be expressed as a temporal gradient. Spatial gradients represent the difference of intensities around a particular pixel or groups of pixels in an image frame. For example, the intensity of a pixel X in a first image frame and the intensity of surrounding pixels X−1, X+1, Y−1, Y+1, can be represented as a oriented gradient showing the difference in intensity between X and surrounding pixels X−1, X+1, etc. By way of further example, a black pixel right next to a white pixel that is right next to a black pixel is a very strong gradient whereas three white pixels in a row have no gradient.

Accordingly, both spatial and temporal information is defined in the histograms. Coupling such spatial information and temporal information enables a single Vitruvian characterization to be both a function of single image content as well as of dynamic motion content over time throughout multiple images.

It should be understood that one or more pre-processing operations can be performed on the image frames prior to performing steps 510 and 515. By example and without limitations, pre-processing on the image data prior to analysis can include scaling, orienting the image frames in coordinate space and the like as would be understood by those skilled in the art.

It should also be understood that additional pre-processing operations can be performed by the configured processor on the spatial and temporal information before populating the information in the histograms. By example and without limitation, pre-processing can include, Computing algebraic combinations of the derivatives of the tracked flow paths, deepr, spatial derivative textures, motion boundary histograms akin to Inria CVPR 2011, Kalman, filters, stabilization algorithms and the like.

Then at step 520, the salient pixel continuities are identified. The mobile device processor 110, which is configured by executing the software modules 130, including, preferably, the analysis module 172, can identify salient pixel continuities by analyzing the "optical flow" of the pixels throughout the sequence of frames and recorded in the histograms.

In general, the path of movement of one or more pixels can be analyzed and compared to prescribed criteria in order to determine what characteristic the flow exhibits (e.g., is flow representative of a static pixel, a continuously changing position, of non-fluid motion such as jumping around the image frame, etc.). Preferably, the salient pixel continuities are those pixels and groups of pixels that have optical flow values that are continuous.

More specifically, the configured processor can compare the optical flow gradients of a pixel to a prescribed set of continuity criteria which are defined to ensure the presence of flow dynamics. For example and without limitation, continuity criteria can include but is not limited to, the presence of deeper derivatives on the flow tracks of the pixel defining a particular keypoint. By way of further example, continuity criteria can be established through analysis of image sequences captured of live subjects to identify optical flow values/characteristics exhibited by live subjects as compared to flow values/characteristics exhibited by imagery taken of non-live subjects. It should be understood that these characteristics can be unique to the user or can be characteristics shared by other live subjects. If the pixel associated with a particular keypoint has flow that meets the continuity criteria the particular pixel can be identified as salient continuities. In other words, if the pixel exhibits flow that meets the continuity criteria, the pixel or group of pixels can be determined to indicate liveness. If pixels showing liveness are found, then the processor can determine that the subject of the images is alive, hence, determining liveness, as further described herein.

It should be understood that, because histogram bins are essentially distributions of pixel areas, the configured processor can analyze flow on a pixel by pixel basis or greater groups of associated pixels (e.g., multiple pixels defining a particular keypoint).

Then at step 525, Vitruvian primitives can be computed based on, among other things, the salient pixel continuities identified at step 520. The Vitruvian primitives are computational constructs that characterize a particular user's Vitruvian region according to the spatial arrangement of features identified at step 510 and dynamic information identified at 515. More specifically, the primitives are computed, using the configured mobile device processor, on the space of the histogram distributions. Because the space of histograms can be very computationally expensive and mobile devices are generally not as computationally powerful as traditional biometric authentication systems, the Vitruvian primitives can be computed on the space of histograms thereby resulting in histograms that are lower in computational complexity.

In some implementations, the configured processor can expand the spatial keypoint binning to higher algebraic combinations of gradient forms, thereby resulting on all possible spatiotemporal distributions of binned quantities. The configured processor can compute the features in a short spatiotemporal domain, for example, up to 5 pixel image frames. However, it should be understood that shorter or longer spatiotemporal domain can be used. For example, when applying Eulerian coupling a longer domain is preferable.

Then at step 530, the Vitruvian primitives are stored by the configured processor in the memory of the mobile device as a Vitruvian identifier. In addition, the configured processor can generate and store one or more biometric identifiers which includes at least the Vitruvian identifier.

It should be understood that while routine 500 is described in reference to generating a Vitruvian identifier, such terms should not be interpreted as limiting, as the routine 500 is applicable to the extraction and characterization of any number of biometric features from imagery of any portion(s) of an individual's body, including but not limited to, the user's face, eyes (including the iris) and/or periocular region to define a biometric identifier. Moreover, the routine 500 is also applicable to the identification and characterization of features from imagery of non-human subjects.

It can also be appreciated that, in addition to characterizing a user by generating a Vitruvian identifier according to routine 500 as described above, additional biometric features can be extracted from the image sequence captured at step 505, or captured separately from step 505. Such additional biometric features can include by way of example and without limitation, soft biometric traits. "Soft biometric" traits are physical, behavioral or adhered human characteristics as opposed to hard biometrics such as fingerprints, iris, periocular characteristics and the like which are generally invariant. However, it should be understood that certain features within the periocular region can offer information about features that can be used as soft biometrics, such as eye-shape. By way of further example, soft biometric traits can include physical traits such as skin textures, or skin colors. Soft biometrics can also include motion as detected by smartphone gyroscope/accelerometer, eye motion characteristics as detected by eye tracking algorithms and head motion characteristics as detected by tracking the movement of a face and/or head.

Such biometric features can be extracted and characterized according to the foregoing method as well as existing biometric analysis algorithms. In addition, the additional characterizations of the user's biometric features can be encoded as part of the Vitruvian identifier concurrently to execution of the exemplary routine 500, or otherwise included in a biometric identifier which includes the Vitruvian identifier, for example by fusing the soft biometric identifiers with the Vitruvian identifier.

It should also be understood that the biometric identifier is not limited to including the exemplary Vitruvian identifier and can include any number of alternative biometric representations of a user such as identifiers generated according to known biometric identification modalities (e.g., iris, face, voice, fingerprint, and the like).

According to another salient aspect of the subject application, the biometric identifier that is generated by, among other things, extracting dynamic information selecting salient pixel continuities and recording the temporal gradients e.g., 'flow' characterizes the user's biometric features and is also indicative of the liveness of the user. Accordingly, in addition to generating a Vitruvian identifier that is also indicative of liveness, process 500 can also be implemented to determine liveness and/or generate a liveness identifier for the purposes of determining the liveness of user. As such, the configured mobile device processor employing one or more of the steps of process 500, can extract and record dynamic information of local key points in the images, and analyze the dynamic information to, at a minimum, identify salient continuities that exhibit flow to define a liveness identifier. It should be understood that the liveness identifier can be separate from or integrally incorporated into the Vitruvian identifier generated by exemplary process 500. As such, references to liveness identifier can be interpreted as a distinct identifier or the Vitruvian identifier.

In addition, as discussed above in relation to FIGS. 3-5 and further discussed herein, liveness can be determined by differentiating between a real face and an attempt to spoof the authentication process using, for example, a photograph or video of a face.

Some liveness detection systems attempt to distinguish between real faces and 'spoof' photographs and videos by analyzing the image quality of the face. For example, photographs and videos may have a lower contrast ratio than that of a real face, or may have a lower resolution and therefore appear less sharp. However, it can be difficult for a camera to identify such differences if the spoof print is also of high image quality. Other liveness detection systems check that the face is live by requesting the user to make actions on request, for example by asking the user to blink at a certain time. A disadvantage of this technique is the user's actions must be interrupted to pass the test. As such, liveness detection systems that can reliably operate without requiring actions by the user can be beneficial.

In accordance with the disclosed embodiments, liveness can be determined based on one or more reflectivity characteristics of the imagery captured by the mobile device camera, for example, by illuminating the face by using light from the display or a light emitter, and determining that the reflectivity characteristics of one or more images captured by the camera are consistent with that of a real face, and/or that the reflectivity characteristics of the camera image are not consistent with that of a photograph or video display or other object.

Figure 7:
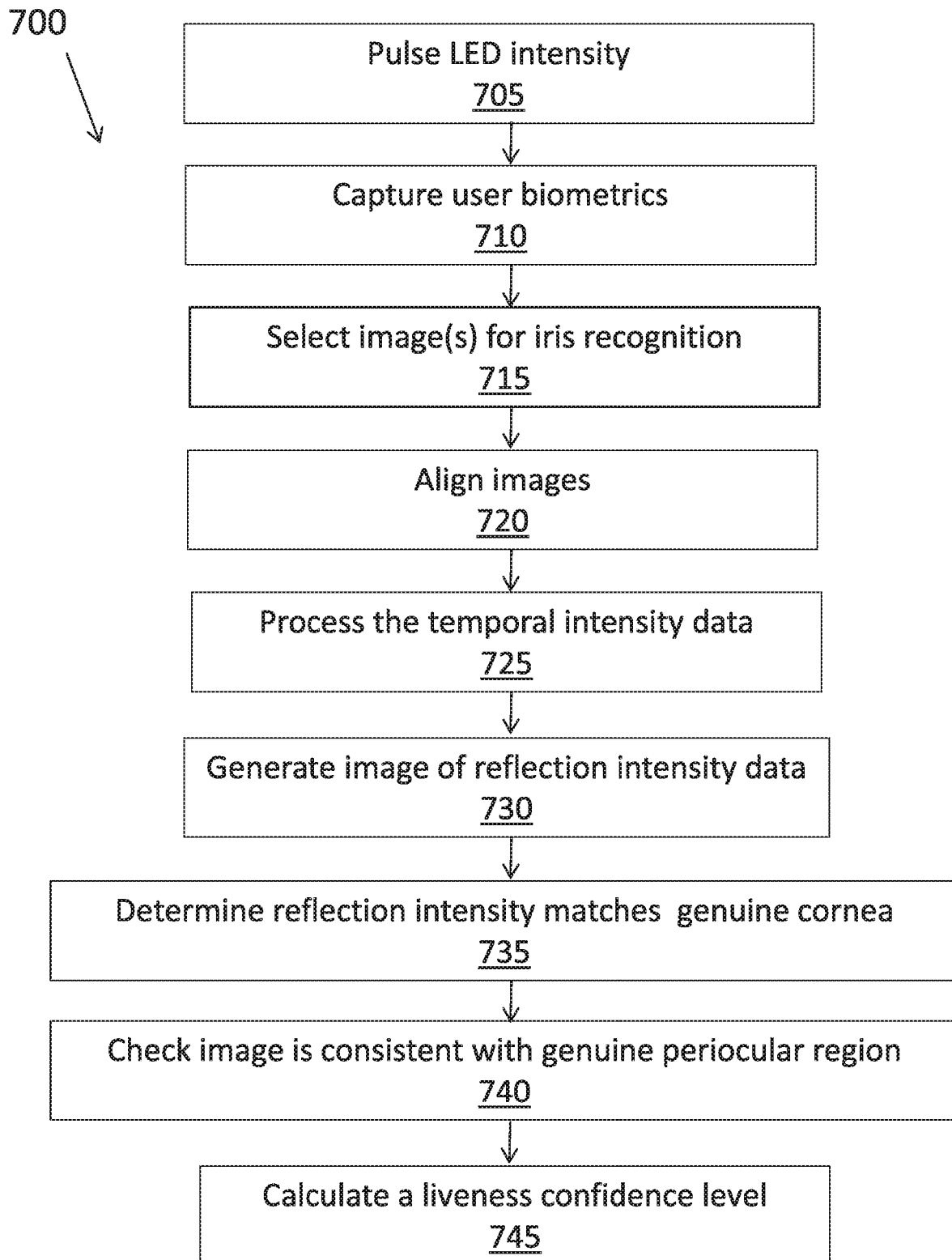
FIG. 7 is a flow diagram showing a routine for determining liveness in accordance with at least one embodiment disclosed herein.

Turning now to FIG. 7, a flow diagram illustrates a routine 700 for detecting the user's liveness from one or more images in accordance with at least one embodiment disclosed herein using, for example, a mobile device 101a having a processor 110 which is operatively connected to one or more light emitters. In some implementations, the light emitters can be light emitting diodes (LEDs) that can emit light in the visible spectrum, infra-red (IR) spectrum, near-IR (NIR) spectrum and the like or any combination of the foregoing. Systems and methods for determining liveness based on reflectivity characteristics of images of facial features (e.g., from the eyes, skin, cornea, and the like) are further described herein and in co-pending and commonly assigned U.S. patent application Ser. No. 14/201,462, entitled "SYSTEMS AND METHODS FOR DETERMINING LIVENESS" filed Mar. 7, 2014.

In order to more reliably distinguish a user's real eye from an impostor, say, a high resolution print of the user's eye (e.g., 'spoofing') the mobile device processor can capture imagery of the user's eyes/face and analyze the images to ensure reflection characteristics particular to a human cornea are present in the captured image. In some implementations, this can be done by pulsing the intensity of one or more of the LEDs, and capturing imagery while pulsing the LEDs using the camera (step 710). In the case of a printed cornea reflection the reflection will be continuously present in the images captured, in the case of the genuine cornea, the reflections depicted in the images will pulsate as the LED does. Accordingly, by analyzing the reflections, the mobile device processor can distinguish between reflections of the LED from a genuine cornea and a print that includes an image of a reflection in the cornea.

In a preferred embodiment, one of the LEDs remains continuously on and one of the NIR LEDs is pulsated at 3 Hz with its intensity varying sinusoidally; and the camera has a frame rate of more than 12 frames per second (fps). Preferably, the camera captures multiple image frames for analysis, for example, 30 images. The processor can then analyze the captured images and select, the one or more images having the highest image quality (e.g. bright and unblurred) to be used for iris pattern recognition so as to identify the user (step 715). All of the images, or a subset, can be used to detect the presence of cornea reflections and determine liveness as further described herein.

In order to detect reflections, the processor can align the images so that all images of the iris occur at the same position in each image (step 720). It can be appreciated that the aligned images provide data relating to the intensity of the iris spatially (like a photograph), and temporally (like a video).

Then, at step 725, for each pixel spatially, the processor can process the temporal intensity data to determine the magnitude of the frequency component at 3 Hz, and divide this by the magnitude of the frequency component at 0 Hz. For example, this can be performed by the processor using a Goertzel filter. As a result, the processor can generate an image that shows the strength of the reflection from the pulsating LED compared to the strength of the reflection from the continuous LED (step 730). As can be understood by those in the art, the physical composition of a genuine eye/cornea does not reflect the same amount of light as a non-genuine reproduction nor do they reflect light in exactly the same manner. Accordingly, the processor can then analyze the resulting image to determine if the reflection intensities are indicative of a genuine cornea or a reproduced cornea (step 735). In the case of a printed eye being imaged, the resulting image can have generally constant intensity and of about 50% intensity of a genuine cornea. In the case of a genuine cornea (e.g., captured from a live subject) the resulting image should exhibit a sharp peak of high intensity corresponding to the reflection that is only created by the pulsating LED and not the continuous LED. In addition, the processor can also detect differences in intensity due to shadows created in the periocular region, which give an additional indication that the acquired image has a 3D profile and hence is a live subject.

In addition, at step 740, the processor can analyze the resulting image using an image processing algorithm to check that the resulting image is consistent with that expected from a genuine periocular region. It can be appreciated that the reflection of light from a genuine cornea is a function of the curvature of the eye, which varies from the reflection of a reproduction, say, a flat image of the cornea. As a result the pattern of light reflected (e.g., concentration) varies accordingly. In some implementations, the image can be compared to one or more similarly generated images of genuine periocular regions (e.g., of the user or other users) or compared to prescribed characteristics identified from analyzing imagery of genuine periocular regions. For example, the processor can employ a haar classifier, and/or algorithm for detecting the presence of a strong reflection peak within the region of the pupil, and of an expected size/concentration of the reflection.

Then, at step 745, the processor can calculate a confidence level indicating the likelihood that the images are captured from a genuine periocular region. For example, the confidence level can be a function of how closely the resulting image matches the one or more previously generated images or prescribed characteristics (e.g., as determined at step 740). In addition, the confidence level can be a function of whether the intensity exhibits more constant intensity characteristic of imaging a non-genuine periocular region or exhibits sharp peaks of high intensity corresponding to the reflection that are characteristic of imaging a genuine periocular region (e.g., as determined at step 735). If the liveness confidence level exceeds a prescribed confidence level threshold, the processor can determine that the user is alive and authenticate the user accordingly.

In other embodiments, the LED's can both be pulsated out of phase with each other. The frequencies of the LED pulsating, and the number of frames captures may be adjusted. Pulsating light allows the system to slow down the frame rate of capture to acquire more detailed imagery. For example, pulsating the LEDs out of phase or at different frequencies can enable the system to capture data for determining liveness in varying spectrums. Moreover pulsating LEDs at different frequencies can be used to perform analysis in different ambient light scenarios. For example, outdoors where ambient IR light levels are high and indoors where IR levels are lower. Also bursts of IR light can be emitted and can improve the quality of the data collected as compared to a single stream of light and can prolong LED life. Pulsating frequency can also be varied so as to avoid triggering adverse physical responses from users, for example, epileptic reactions. Moreover, simple image subtraction could be used in place of pulse frequency analysis to reduce the number of frames required.

In addition or alternatively, the mobile device processor 110, executing one or more software modules 130, including, preferably, the capture module 172, and the analysis module 174 can capture images of the user using the mobile device camera, and can analyze the images to detect the presence of the user's face, for example, by using shape recognition or other known face identification techniques. Once the face is detected in the images, the configured processor can similarly locate one or more of the user's eyes in the images. In addition, the configured mobile device processor 110 can cause the display (or a light emitter) to be pulsated, for example, by changing the intensity of the light emitted by the display. Preferably, the intensity is pulsated over time sinusoidally at a frequency of 3 Hz, for 2 seconds. During this time the configured processor, using the camera, can capture images of the eye and record the images, preferably, at a frame rate of at least twice the frequency of the display pulsation (e.g., flash).

In a further embodiment, as the images are recorded, the position of the eye can be tracked so that all of the images to be analyzed will be of the eye and have at least a generally consistent alignment with one other. It can be appreciated that the eye tracking can be performed in accordance with the disclosed embodiments and/or known eye position or eye tracking algorithms, as would be understood by those in the art. In some implementations, the configured processor can cause an animated logo, or information such as a news feed to be displayed during the measurement so as to draw the user's eyes to a particular position, and entertain the user during the image capture process.

After image collection, the mobile device processor 110, which is configured by executing one or more software modules 130, including the analysis module 174 can perform an analysis of the images to check that the reflectivity characteristics of the eye are consistent with that of a real eye and not a photograph. In some implementations, the configured processor can analyze reflectivity characteristics to determine whether the curved surface of the cornea has produced a small, sharp, specular reflection of the display that is visible to the camera, as discussed above. A photograph/video generally produces a diffuse reflection that is uniform across the whole image, or a speculate reflection from a flat surface making it much larger than from that of an eye.

In addition, each pixel of the frame sequence can be analyzed, by the configured processor 110, to identify the strength of the frequency component at the display pulsation frequency (referred to as the "power signal"). Thus a 'power image' image can be created where the intensity of each pixel is the power signal.

A power image of a real eye will contain a peak over the cornea of the eye. The presence of a peak is tested by the configured processor 110, for example, by applying a band pass filter over the image to remove high frequency noise and the low frequency background, then finding the peak power signal in the power image, then checking that the peak is of the expected size and magnitude above the background. A determination of liveness can be made against this data.

Alternatively the power signal may be calculated as a ratio of the signal strength at the display pulsation frequency divided by the sum of the signal strength at other frequencies. This means that if the signal is noisy (and other frequencies exist perhaps due to motion or motion blur), the power signal is reduced and so is discounted from the final power image. Such motion noise can be present during for example, eye movement, photo movement, or movement in a video spoof.

Additionally the phase of the power signal at the display pulsation frequency can be calculated and compared with the phase of the display pulsation frequency. If the phase of the power signal is not in phase with the display frequency then the configured processor 110 can conclude that the power signal must be from noise and discounted or attenuated as an indicator of liveness.

In some implementations, for speed of analysis, a Goertzel filter could be used, by the configured processor 110, to measure the power signal at intervals over the frequency spectrum.

In addition or alternatively the mobile device can be configured to analyze reflectivity characteristics of imagery captured by the camera as discussed above, except that the display can be caused to pulsate at the sum of two (or more) frequencies, for example 3 Hz and 2 Hz, with a particular phase difference, say 180 degrees. Accordingly, the power signal is then calculated as the sum of the signal at 2 Hz and 3 Hz divided by the signal at other frequencies.

The phase signal can be calculated as the difference between the phase at 2 Hz and 3 Hz, and the more the signal's phase deviates from the expected 180 degrees the more it is discounted or attenuated as an indicator of liveness.

In some implementations, the power image may make use of 'super pixels' to reduce quantization noise. Quantization occurs when the intensity of each pixel in the image frames from the camera are stored as a discrete value (typically an integer from 0 to 255). To reduce the negative effects of this quantization on the power signal, each pixel may be averaged with surrounding pixels (e.g. using a Gaussian blur with a blur diameter roughly equal to the width of the expected size of the display reflection from the eye) to create a 'super pixel' that has less quantization artifacts. These super pixels are stored with a greater intensity accuracy than in the original image frames (such as with a 32 bit floating point number, or 16 bit integer giving intensity values with 65536 steps rather than 255). This increases the quality of the power signal that can be derived and makes the systems less prone to error.

In a further embodiment, the mobile device can be configured to pulsate the display and analyze reflectivity characteristics of imagery captured by the camera as discussed above, except that the phase of the display pulsation is different for each color channel. This has the result of making the color of the display change with time, and the phase image can be calculated based on the expected phase difference between each color channel. For example by making the red and blue channels have phase 0 degrees, and the green channel have phase 180 degrees, the display will pulsate between green and magenta.

In a further embodiment, instead of or as well as the reflection peak from the cornea being detected the configured processor executing the analysis algorithm checks for the presence of shadows from the display illumination on the face and checks that they are consistent with that of a real face and not a photograph or video. For example, this could be done using a Haar Classifier on the power image, or a 'shadow image' that is a combination of the power image and the power image at 0 Hz.

Although the foregoing exemplary embodiments for analyzing reflectivity characteristics of imagery captured by the camera to determine if the reflectivity is consistent with a live cornea, similar methods can be performed to determine that the reflectivity is not consistent with the reflectivity of a high resolution print or video display.

One characteristic of nearly all prints and video displays is that they are substantially flat. Therefore the specular reflection from their surface will be similar to that of a flat mirror. When a print or video of a face is presented (directly facing) the smartphone camera, the smartphone camera would be able to capture a reflection of the smartphone display in the print or video caused by the specular reflections. Such a reflection is not expected from a live person because human skin has a highly diffuse reflectivity and the face is not flat.

The display reflection could be detected (for example) by using methods similar to that used to detect display reflections from the cornea of the eye. For example, the display could be pulsated at a known frequency and the display reflection could be isolated from the background by isolating intensity changes at that frequency. Similarly the display could show a pattern spatially and the presence of this pattern could be searched for in the camera image by the mobile device processor 110, which is configured by executing the software modules 130, including, preferably, the analysis module 174.

The reflection pattern can be compared to known reflection patterns and characteristics of various surfaces (e.g., a photograph or video display) and if the reflection of the display is consistent with that from a substantially flat surface then the configured processor can determine the imagery is the result of a spoof attempt. Similarly if the reflection is consistent with a print or video that has been curved in only one dimension (or other non-face like shapes) the processor can also determine that the imagery is the result of a spoof attempt. Similarly if the reflection is consistent with that from a display with a diffusive anti-glare coating (as is used on some liquid crystal display panels) the imagery is the result of a spoof attempt.

In addition or alternatively the configured mobile device processor 110 can analyze the imagery to check that the reflection of the display in the face is stronger than that from the background. To do this the configured processor 110 can average all the pixel intensities from the face region and look for the display flash frequency, and compare this to the same figure for the background pixels. It can be expected for the reflection from the face to be stronger than the background because it is closer to the smartphone display and camera than the background.

At this juncture it should be noted that the foregoing exemplary embodiments for analyzing reflectivity characteristics of imagery captured by the camera, so as to differentiate between a real face and photograph or video of a face are not limited to smartphone devices and can be applied to any device with a light source and a camera, such as a laptop computer with a webcam. In addition, the frequency of the display pulsation (e.g. flash) could be any frequency, and the duration of the measurement may be adjusted depending on the confidence required from the measurement. In addition, a lux meter could be used to measure ambient light levels and increase the measurement time in high lighting such as sunlight. Knowledge of the ambient light levels could also be used to help determine the expected power signal. For example, in medium lighting the configured processor might expect the strongest signal strength, in low light levels the configured processor might expect the eye reflection peak to saturate the camera, and cause reduced signal strength, in high ambient lighting the configured processor might expect the signal strength to be reduced. In addition, in some implementations, the phase of the power signal in the region around the eye or the whole face could be checked to see if it is consistent with that expected from the display pulsation signal. If the phase is consistent it indicates that ambient light is low enough for good signal to be detected from the face, if it is not consistent it indicates weak signal and therefore likely high ambient lighting. This information can be used in place or as well as a lux meter.

In a further embodiment, liveness can be determined by detecting movement of higher level facial features, for example, by smile detection. Face matchers without liveness protection can be fooled by high resolution photographic prints. Such face images are freely available for almost anyone on the internet. A smile detection system can recognize facial expressions, so it can request the user to 'smile to log in'—this is something that a photograph cannot do thereby increasing the systems security against spoof attempts.

In some implementations, the optical flow characteristics of low, medium and high level features can be used to detect a smile or other such facial movement. For example, the mobile device processor 110, executing one or more software modules 130, including, preferably, the capture module 172, and the analysis module 174 can analyze a video sequence of images to determine liveness by: finding the face in the imagery, then stabilizing the video frames of the mouth region, then splitting the mouth into a left and right region, and calculating the optical flow of each region. In the transition to a smile the optical flow of the left and right regions will on average move away from each other. Optical flow analysis naturally identifies corners and edges that are associated with the mouth and so it provides an efficient way of analyzing the movement of the mouth. Accordingly, liveness can be detected by determining that the optical flow characteristics of the facial features that match expected optical flow of any number of facial expressions. Alternatively a Haar cascade algorithm could be used to detect a smile. Similarly, eye brow raise detection, or blink detection could be used.

In accordance with the disclosed embodiments, gaze detection can be used to provide a discrete liveness test by asking the user to move their eyes in a particular way and determining if the movement of the user's gaze moves as requested. For example, the user can be asked to 'watch the lights switch on', then 3 light bulbs (left middle right) each turn on at random. If the user moves their gaze to each light bulb correctly as they illuminate then they pass the test. A photograph would fail this test, as should a video due to the specific and randomized iris movements that are requested. This test could be used in combination with other liveness tests such as facial expression testing or smile detection. Such gaze detection can be performed using the exemplary methods for detecting the movement of low, medium and high level facial features described in relation to FIG. 5 as well as using known computer vision techniques described in, for example, "In the Eye of the Beholder: A Survey of Models for Eyes and Gaze," Published in: Pattern Analysis and Machine Intelligence, IEEE Transactions on (Volume: 32, Issue: 3) and Biometrics Compendium, IEEE Date of Publication: March 2010 Page(s): 478-500 ISSN: 0162-8828.

In a further embodiment, liveness can be determined by detecting vital signs that are present in live subjects. Each time a live subject's heart beats the subjects face pulsates. This pulsation is so small that it cannot be detected by human eyes but it can be captured in imagery and detected using image processing of the video signal (e.g., the image sequence captured using the video camera). Accordingly, in accordance with the disclosed embodiments, the mobile device can be configured to determine liveness by analyzing the imagery and determining that the captured subject has a pulse. In some implementations, the mobile device processor 110, executing one or more software modules 130, including, preferably, the capture module 172, and the analysis module 174 can stabilize the video images captured by the camera and use pulse detection algorithms to determine the presence of a pulse in the sequence of images. In addition or alternatively, the configured mobile device processor can differentiate between photograph and live person by pulse amplitude mapping, determining the strength of the pulse signal, determining the color of the pulse signal, determining the level of noise in the frequency domain. Moreover, the configured processor can also use a second mobile device camera and LED to measure a user's pulse in the finger to help identify the pulse in the face because the pulse from the finger is more reliable. Accordingly, using the pulse measured from the finger, all other frequencies from the face can be easily identified as noise by the configured processor. Alternative methods for detecting a subject's pulse from imagery are described herein and can be found in, for example, "'Remote plethysmographic imaging using ambient light', Wim Verkruysse et al, Optics express, 22 Dec. 2008."

The user's pulse can be assumed to be the strongest physiologically viable frequency component of the signal, however, a noisy signal from that of a photograph can also have an assumed pulse. Accordingly, for liveness detection, it is preferable to distinguish between a noise signal from a photograph and a genuine pulse signal from a live person. In accordance with the disclosed embodiments, in some implementations the configured processor can distinguish between a noise signal from a photograph and a genuine pulse signal by checking the variance of the assumed pulse frequency throughout the data. For example, if 20 seconds of video data is recorded, the assumed pulse can be calculated by the configured processor using data from 0 to 5 seconds, 1 to 6 seconds, 2 to 7 seconds and so on. If the pulse signal is genuine the configured processor should determine that there is a low variance between each of these measurements, if the signal is from noise a higher variance is expected. Accordingly, this variance information can be used by the configured processor to distinguish between live and spoof signals.

Similarly, as a subject breathes their chest moves and this motion can also be detected to ensure the subject is breathing. Accordingly the configured mobile device can be configured to detect spoof attempts by analyzing the imagery and detecting such chest movement so as to differentiate between a live subject and a static reproduction (e.g., a photograph which won't exhibit such movement).

In a further embodiment, liveness can be determined by performing three-dimensional (3D) analysis of the imagery to verify that the imagery captured is of a live subject having 3D depth as opposed to a generally flat reproduction of the subject (e.g., using a photograph or video display).

In accordance with the disclosed embodiments, the mobile device processor 110, executing one or more software modules 130, including, preferably, the capture module 172, and the analysis module 174 can prompt the user to make a scanning motion around their face with the phone camera (e.g., a side to side scan, up and down scan and the like). Using the captured imagery, the configured processor can use 3D imaging techniques to build a 3D model of the user. Whilst photos and videos are flat, a live subject is not. By requiring the authentication object to have a 3D face like shape, it is drastically more difficult to spoof the system using photographs or video.

The measured optical flow of pixels and features of the one or more images, for example, as discussed above in relation to FIG. 5, can be used to determine liveness based on such a 3D analysis. Imagine looking out the side of a car as one travels, the objects in the foreground move pas very quickly because they are close, whereas the distant objects appear to move by more slowly. Similarly, a mobile device camera moving past a face should capture imagery showing the nose move by faster than the eyes and the ears because it is closer. Accordingly, the optical flow analysis of the scene can utilize this relative motion to deduce how far away the objects captured are. If the subject is a real person their nose is closer to the phone than their eyes, however, if the subject is a photograph or a video then it is not. Thus, the spoof can be detected by analyzing the optical flow to detect the distance of various low, medium and/or high level facial features or a combination of the foregoing. In addition, the configured mobile device can also verify that the mobile device is moving and not the face rotating by analyzing the optical flow of the background to the face or the accelerometers and or compass in the mobile device.

Further to the foregoing 3D analysis using imagery, in addition or alternatively, a hardware based depth sensor could be used provide depth information about the face. For example a structured light depth sensor could be used such as that used in the Microsoft Kinect depth sensor by Microsoft Inc. and the Google Tango phone by Google Inc. Similarly, a time of flight depth sensor could be used, or a stereo camera. Using such devices, liveness can be deduced from just one image with a depth map, and that it is difficult to spoof a face correctly in three dimensions.

In some implementations, the depth maps from several images could be combined to increase the accuracy and/or extent of the depth mapped region. In addition, a depth map can be created using focus information from the optical camera of the mobile device. If the focus is swept from near to far as video frames of the face are collected, the distance of each region from the camera could be deduced by identifying which of the frames is the sharpest for that region. The nearer the region's sharpest frame is to the start of the frame sequence, the nearer that region of the image must be to the camera.

In some implementations, an image of the face can be produced as would a depth map. During enrolment the face would be found and the corresponding region of the depth map would be stored with the face image. On authentication the similarity of the face image can be tested and the similarity of the shape of the face would also be tested, including comparison of the size of the face. The comparison could involve first aligning the enrolled depth map with the test depth map in all three dimensions using techniques such as Iterative Closest Point (ICP), and then assessing the quality of the match.

Other additional hardware devices could also be useful for assessing liveness. For example spoof images are likely to look different to a (near) infra-red camera than a visible spectrum camera. For example, liquid crystal displays are typically transparent in the infra-red, and many inks have different absorption in the infra-red spectrum. Human faces have certain features in the infra-red spectrum that could be confirmed by the use of infra-red imaging, for example in the infra-red irises have a higher reflectivity. By way of further example, in the deep infra-red, the temperature profile of the face becomes apparent. Accordingly, liveness detection can be performed by the configured processor by generating a temperature profile of a user and then analyzing the temperature profile to confirm that the face has an expected temperature, or temperature pattern of a human face as opposed to a video display or photograph. The expected temperature can be determined during enrollment and/or based on known characteristics of human faces and various methods for representing a human's face as discussed above.

Image resolution, intensity histogram analysis, eye movement detection, video scan frequency detection, and video pixel moire patterns with the camera CCD pixels, voice recognition may also be used to distinguish between live and spoof images. Accordingly it can be appreciated that, in accordance with the disclosed embodiments, liveness can be detected, by the configured mobile device processor, using any combination of the foregoing exemplary liveness detection methods.

The systems and methods for authorizing access to an access-controlled environment are not limited in any way to the illustrated embodiments and/or arrangements as the illustrated embodiments and/or arrangements described are merely exemplary of the systems and methods disclosed herein, which can be embodied in various forms, as appreciated by one skilled in the art. Some alternative embodiments, arrangements and exemplary applications include the following exemplary embodiments.

In some implementations, a user mobile device 101a configured by executing the one or more software modules 130 of the secure authentication client application, for example, as a background application, can determine that the user 124 has opened another application that enables the user to search for goods on the internet and make a purchase from an ACE, for example, iTunes by Apple Inc. The configured mobile device processor 110 can also be configured to determine, from the user profile including user defined access rules/preferences input during enrollment, that the particular application is a preferred ACE. As a result, the mobile device processor can automatically initiate the exemplary authentication process described in reference to FIGS. 3-5. In addition or alternatively, if the user preferences can specify that the user prefers to only log-in and authenticate upon making a purchase and the mobile device processor can initiate biometric authentication responsive to a user initiating purchase through the iTunes application.

To authorize the user, the mobile device processor can prompt the user to scan his/her biometrics using the mobile device camera. Then, the mobile device 101a and/or the system server 105 can determine: if the user is biometrically authenticated, has an iTunes account and/or is authorized to perform the transaction using the account. For example, the authentication process can include biometrically authenticating the user using the mobile device and transmitting from the mobile device to the system server 105 a transaction request identifying the user and including information concerning the ACE requiring user authorization (e.g., iTunes). If the user's biometrics are not authenticated by the mobile device or the user is not authorized by the system server 105, the mobile device can alert the user with a tone. Upon successful biometric authentication and authorization, the system server 105 can query the user profile created during enrollment to retrieve information associated with the user's transaction account (e.g., the iTunes account) and transmit an authorization notification confirming the user's identity and including the user's transaction account information necessary to complete the one or more fields. The authorization notification can be transmitted to the mobile device 101a, thereby causing the mobile device to automatically complete the required fields so as to complete the user login and/or complete the song purchase according to the user preferences.

In another exemplary implementation, a user computing device 101b, which has been enrolled with the secure authentication system (e.g., a personal laptop) and is configured by executing the secure authentication client application, can determine that the user 124 has opened a web browser and has navigated to a social network website requiring user authentication. The computing device can also determine from a user profile stored locally that the particular website is an ACE that is preferably accessed using the system 100. The computing device can also verify the site key to assure no spoofing. Responsive to determining that the website is a preferred ACE, the configured user computing device 101b can initiate the authorization process by transmitting an authorization request identifying the website and the user to the system server 105. Based on the authorization request, the system server 105 can locate a user profile associated with the identified user and identify an enrolled mobile device 101*a* that is also associated with the user and/or user profile. The system server can then transmit a biometric authentication request causing the identified mobile device to biometrically authenticate the user. Upon biometric authentication of the user, the mobile device can transmit a transaction request confirming authentication and identifying the user and mobile device 101*a* to the system server. Using at least the transaction request, the system server can authorize the user to access the website and transmit an authorization notification to the user computing device 101*b*. In response to the authorization notification the user computing device can automatically complete the fields required to complete the user login facilitating the user's access to their online account. In some implementations, the authorization notification can include the user log-in information retrieved from a user profile maintained by the system server 105. In addition or alternatively, the authorization notification can prompt the user device 101*b* to retrieve the requisite log-in information from an instance of the user's profile stored by the computing device 101*b*.

In another exemplary implementation, an enrolled user computing device 101*b* (e.g., a personal laptop), which is configured by executing the secure authentication client application, can determine that the user has opened a browser application and navigated to a communications service provider (e.g., www.skype.com). The user computing device 101*b* can also determine whether the user profile preferences names the payment service provider as a trusted and preferred ACE and can also verify the site key to assure zero spoofing. The user computing device 101*b* can then initiate the authorization process to authorize the user by the mobile device and the system server in authorized in accordance with the disclosed embodiments. Upon authorization, the system server 105 can transmit an authorization notification, which includes a unique one-time fused key to the user computing device 101*b* and cause the computing device to automatically decrypt the fused key using a corresponding key stored by the user computing device and complete the required fields necessary so as to complete the user login and thereby allowing the user to gain access to their online account. For example, the key can be based on the user's biometric identifier, a user identifier, a mobile device identifier or a combination of the foregoing.

By way of further example, after log-in, the user may encounter additional authorization points, for instance, if the user needs to purchase credits to continue using the service and selects a "PayPal" payment option. Accordingly, the user computing device 101*b* executing the secure authentication client application can again initiate user authorization by transmitting an authorization request identifying PayPal as the ACE to the system server 105. Upon user authorization in accordance with the disclosed embodiments the system server can transmit an encrypted authorization notification to the user computing device 101*b* including the user's PayPal account information, which is stored by the system server in the user profile, thereby causing the computing device to complete the transaction by automatically populating the required fields with the received payment information and transmitting the information to the back end server(s) associated with the ACE (e.g. paypal and/or skype).

In another exemplary implementation, the disclosed embodiments can be used to facilitate payment at a computing device 101*b*, which is a transactional terminal associated with an enterprise organization, for example, a point of sale terminal at a supermarket. In some implementations, the user can initiate a payment transaction by selecting, on the user's mobile device 101*a*, the particular supermarket from a list of preferred merchants stored in the user profile. Based on the user's selection the mobile device 101*a* can identify user preferences concerning transactions conducted with the particular merchant. For example, that the user prefers to make payments using a particular credit card account identified in the user profile and also prefers to use a loyalty program account when making purchases. Accordingly, upon receipt of the user tapping a pay button on the mobile device user interface 115, the mobile device 101*a* can prompt the user to scan his/her biometrics and the mobile device and/or system server 105 can determine if the user is biometrically authenticated and authorized to make a payment using the particular payment method. Upon successful authorization, the configured mobile device using an NFC transmitter can transmit the user's payment information and loyalty account information to the NFC enabled POS device, thereby passing the user information, payment information and loyalty member number associated with the user to complete the transaction.

In another implementation, the point of sale device, (e.g., computing device 101*b*) can receive user identification information from the mobile device 101*b*, and can transmit an authorization request including the transaction information (e.g., price, taxes, etc.) and information identifying the user and the particular merchant to the system server 105. Using the request, the system server can identify the mobile device 101*a* associated with the user and cause the mobile device 101*a* to prompt the user to biometrically authenticate. Upon successful biometric authentication by the mobile device 101*a*, the mobile device can notify the system server 105 by sending a transaction request which includes a secure key identifying the user and the mobile device. Using the key, the system server 105 can identify a user profile associated with the user and the mobile device and identify a payment account for conducting the transaction specified in the authentication request. The system server 105 can then query a secure data-store maintained by the enterprise organization that maintains the user's payment account to retrieve the user's payment information. The system server can process the transaction using the payment information and upon successful completion of the transaction, the system server 105 can transmit an authorization notification to the point of sale device indicating that the transaction was processed. Such an implementation avoids passing sensitive financial and personal information directly to the merchant POS device. Alternatively, the system server can transmit, to the POS device, an authorization notification that includes the payment information thereby causing the POS device or the merchants payment processing system to complete the financial transaction.

In another implementation, a computing device 101*b* controlling a secure access point (the ACE, for example an airport security checkpoint) can be configured to communicate with enabled mobile devices and/or the system server 105. In some implementations, the access point computing device 101*b* can transmit an authorization request directly to a user's enabled mobile device 101*a*. Responsive to receipt of the request, the mobile device 101*a*, which is configured by executing the secure authentication client application, can biometrically authenticate the user. Upon authentication the mobile device can transmit a transaction request to the system server 105 identifying the computing device 101*b*, the user and the mobile device. Responsive to the transaction request, the system server 105 can authorize the user by verifying the user's identity and authorize passage through the access point according to user access rules gathered from the user profile or a secure data store. For example, the rules can concern travel restrictions (e.g., whether the traveler is not on a no-fly list) maintained in a government database. If the system server 105 determines that the user identity is not verified, or the access rules indicate that the user is restricted from travel, an authorization notification can be transmitted to the mobile device 101a to alert the user. The system server 105 can also transmit an authorization notification to the computing device 101b controlling access to the ACE, for example, to prevent user access and/or to alert a guard via a display. Similarly, upon successful authentication, the mobile device 101a and the access point computing device 101b can be similarly notified. In addition, the system server 105 can also transmit user information, for example, a name and picture of the user 124 to the computing device 101b for further authorization if necessary. The authorization notification can also cause the access point computing device to allow the user 124 to physically pass through security check point, for example, open a door allowing the user to walk to their gate and await boarding.

In another implementation, the computing device 101b can be an electronically controlled access point (e.g. a networked electronic lock) at a secure doorway configured to communicate with enabled mobile devices 101a and the system server 105. The access point computing device 101b can transmit an authentication request directly to the mobile device 101a causing the mobile device 101a to begin the authorization process. Alternatively, the mobile device 101a can transmit a message identifying the user and the mobile device directly to the access point computing device 101b thereby prompting the access point to transmit an authorization request to the system server 105 identifying the user and the access point. Using the request, the system server 105 can query the user profile associated with the user to identify the mobile device and transmit a biometric authentication request causing the mobile device 101a to begin the biometric authentication process. Upon successful authentication, the system server 105 can determine from access rules associated with the particular check-point computing device 101b whether the user is authorized to access the secure area and, if so, transmit an authorization notification to the computing device 101b causing the checkpoint to unlock the door.

In some implementations, the user computing device (e.g., 101b) can be a transaction terminal, for example, an ATM, configured to interact with the system server 105. The ATM can be further configured to communicate with the user's enabled mobile device 101a, for example, by transmitting information to the mobile device 101a when the mobile device is within a defined range. Upon receipt of the communication from the ATM, the mobile device 101a can initiate the authentication process by prompting the user 124 to authenticate. The mobile device 101a can capture and authenticate the user biometrics and notify the system server as described in relation to FIGS. 3 and 4. Accordingly, the mobile device 101a and/or the system server 105 can determine if the user is biometrically authenticated and determine whether the user is authorized to use the ATM (e.g., has transaction account(s) that can be accessed using the ATM). Moreover, the mobile device and/or system server can query trusted databases maintained by the system server 105 or an enterprise database (e.g., remote computing device 102, which is, say, operated by a bank) to perform additional security check's according to the user's identity to ensure the user is not restricted from conducting transactions, for example, on an AML (anti-money laundering) or watch list.

If the user is not authenticated and/or lacks permissions to perform the transaction, the user can be alerted via the mobile device 101a. In addition, the bank (e.g., remote computing device 102) or the ATM (e.g., computing device 101b) can be is notified of error or fraud attempt. If authorized, the system server 105 can transmit an authorization notification to the ATM 101b and/or an associated banking network to advance the transaction at the ATM. For example, advancing the transaction can include authorizing the requested transaction, displaying user options (e.g., withdraw cash, transfer funds, check balance, etc.), requesting further user input in furtherance of the transaction and the like as would be understood by those skilled in the art. In this manner, the disclosed embodiments can eliminate the need for transaction cards and PIN numbers and can deter fraud. Moreover, such a system can eliminate the need for arbitrary user account numbers.

In another exemplary implementation, the system server 105 and/or one or more servers and storage devices communicatively coupled thereto, can be configured to host an encrypted file sharing and communication platform. It can be appreciated that the encrypted file sharing platform is not limited to storage or transmission of encrypted data files in the traditional sense and can be applicable to transmission of any electronic data packet. For example, the encrypted sharing platform can be configured to allow users to secure and transmit emails, attachments of any size, text chat, voice calls (VoIP), video calls, group messages and the like.

More specifically, enrolled user devices executing the secure authentication application can be configured to transmit encrypted messages to other enrolled users via the system server 105. As noted above, preferably, all communications between an enrolled user device and the system server can be sent via 2-way SSL secure communication environment using a key that was generated during enrollment based on, for example, the user's biometric identifier, other user and/or device identifiers and/or keys generated during enrollment or a combination of the foregoing. Using an asymmetric key made of the users own biometric data provides a key that is unique to the user and as such is useable to assert the user's identity. Preferably, the key is further encrypted using a 384 bit Elliptic Curve Cipher. Accordingly, the generated keys, biometric information, data and other information encrypted using the keys are also rendered virtually unreadable, except to the system server.

In addition, the system server can also receive rules input by the users using the enrolled user computing devices (e.g., computing device 101b and/or mobile device 101a). For example, the rules received from the user can identity at least one other enrolled user that is approved to receive or have access to the encrypted files or data transmissions. Accordingly, the system server can maintain records of the relationships between the users of the system and facilitate the secure sharing of data between authenticated users that are authorized according to the access rules.

For example, a user can initiate an encrypted data transfer session using mobile device 101a and designate another user as the intended recipient. Accordingly, the system server can cause the sending user to be biometrically authenticated using the mobile device. If the sending user is biometrically authenticated, a 2 way SSL/TLS connection can be established between the system server and the mobile device for every such transaction (e.g., session or transmission) as discussed above. Once this secure connection is created, all data sent by the user across the SSL/TLS layer can be encrypted using the previously mentioned key generated during enrollment. This provides a robust, secure method of transport for all data types between the sending device and the system server.

A salient aspect of the file sharing platform is that it requires biometric authentication and identity assertion to transmit/store/receive or access the encrypted information, thereby providing a high level of protection and security for the information as it passes from a user to another user via the system server. The only device with an ability to decrypt the messages is the system server which contains the overall algorithm used to encrypt and decrypt messages and manages the 2-Way SSL secure communications environment with user devices. In the event that this algorithm was made public, each user's data is still safe, because no user data needs to reside on the system server and all information can resides with the user's on their devices, and only with a valid biometric authentication, under a valid 2-way SSL connection can the information be communicated between the user devices and the system server.

Upon receiving the encrypted message from the sending user and, based on the associated access rules, the system server can securely forward the message to the intended recipient or transmit a notification to the intended recipient informing them that a secure message is waiting to be delivered. In particular, the system server can require the intended recipient to be biometrically authenticated and authorized, and, if successful, the system server can decrypt the message. In addition, the system server can establish a 2-way SSL communication session with the intended recipient's device in order to forward the message to the recipient in a secure manner.

It can be appreciated that the encrypted file sharing platform is not limited to sharing encrypted data files in the traditional sense and can be applicable to transmission of any electronic message. In some implementations, the encrypted sharing platform can be configured to allow users to secure and transmit: Email, Text Chat, Voice Calls (VoIP), Video calls, Group Messaging using any of the above, Attachments of any size. In addition, the platform can be configured to perform other known platform functions, such as message translations, for example, using Google Translate by Google Inc.

In some implementations, the system server 105 can include an encrypted mail server which can sit between an enterprise mail server and the rest of the world, such that it is designed to decrypt and encrypt all outgoing email from an enrolled user that is destined for other designated users. In this way, integration can be very simple for any organization, with no need for them to modify or replace their existing mail server (except to forward all the mail to the secure Mail Server).

It can be appreciated that in some implementations, the system server 105 can also maintain a history of a user's authorizations using the system including any and all of the information collected, and/or processed during the exemplary biometric authentication and authorization processes. For example, records and details concerning financial transactions, purchases, etc. made by the user in accordance with the disclosed embodiments can be stored by the system server in one or more databases, thereby creating a financial audit trail for the user. It should be understood that information concerning any and all access requests, transactions and activity can be stored by the system server 105.

For example, a record of a user's authorization sessions, which can each include GPS and other such physical location data, can be stored by the system server 105, thereby creating a physical audit trail of the user. In addition, the user can be periodically prompted to authenticate with the system server simply for the purpose of recording the user's personal location in an authenticated manner. The physical and financial audit trails stored can be accessible to the user via computing devices that are configured to interact with system server 105. For example, using a dashboard-like interface presented by an enrolled mobile device 101a or computing device 101b executing the secure authentication application or through a web-based user interface. Using the dashboard, the user can adjust settings, preferences and specify access rules for the audit trails (e.g., physical, financial and the like). For example, the user 124 can review and specify other individuals and organizations who are authorized to have access to the user's audit trail data, or specific portions of the audit trails. In addition, the user can grant conditional access to the specified organization/person according to the user's terms, including but not limited to, use restrictions and cost.

In some implementations, the user's GPS location information can be gathered by the user's mobile device 101a or any other GPS enabled computing devices (e.g., computing device 101b) that are associated with the user and/or an access-controlled environment accessed by the user in accordance with the disclosed embodiments. The usage and location information can be stored by the system server 105 on one or more associated datastores. For example, a GPS enabled computing device 101b can be located in the user's automobile and collect GPS location information about the car's location. The location information can be transmitted to the system server 105 or directly to a database so as to maintain a physical audit trail of GPS data for the car and computing device 101b.

By way of further example in some implementations, the system server 105 can also control access to/usage of the computing device 101b and/or an associated ACE (e.g., the vehicle), in accordance with the disclosed embodiments. For example, by requiring biometric authentication/user authorization before providing access to the computing device or vehicle or otherwise restricting access.

Location data can be used for a number of purposes, by example and without limitation, tracking the movement of fleet vehicles, monitoring usage, tracking stolen vehicles and the like. Accordingly, it can be appreciated that in some instances it is desirable to monitor and share the location information collected by the computing device 101b and the associated vehicle. However, in view of privacy concerns, users might not want the location to be tracked unless necessary. In view of such privacy concerns, in some implementations, the user 124 can specify, rules defining the extent that the location information of, say, the computing device 101b, or a mobile device 101a or other computing devices (e.g., a dedicated automobile location tracking device) should be collected or made available for monitoring by individuals/enterprise systems. For example, the user 124 can specify that they do not wish to share the user's location information that is collected while the user is in the vehicle, but desires the location to be monitored while the user is not in the car (e.g., for automobile theft tracking purposes). By way of further example, if managing a fleet of cars and employees, a user 124 can specify that they wish to track the location of a vehicle including computing device 101b, when an employee is in the car.

In some implementations, when the computing device 101b is interacted with (e.g., activated by a user, someone starts the car causing the computing device 101b to begin collecting location information and the like), the computing device can scan the user's biometrics and biometrically authenticate the user in accordance with the disclosed embodiments. In addition or alternatively the computing device 101b can transmit an authorization request to the system server 105. The authorization request can identify the computing device 101b and can also include additional information, say, a gps location of the computing device, an identity of the user, etc. In response to the request, the system server can determine, from the received information and stored user profiles, that the computing device 101b is associated with a user 124 and prompt an associated mobile device 101a to authenticate the user. By way of further example, if multiple users have access to the vehicle having a tracking device (e.g., computing device 101b) the user can be required to identify themselves to the computing device 101b for authorization either before or after accessing the vehicle car. Accordingly, the authentication request can identify the particular user, such that the system server can prompt the appropriate user's mobile device 101a is to biometrically authenticate the user. In addition or alternatively, the system server 105 can notify all approved users such that the appropriate user can continue authentication. In addition or alternatively, based on the location of the computing device 101b, the system server can identify an enrolled mobile device having a corresponding location and prompt the associated user to authenticate.

In some implementations, the user can initiate the authentication process using the computing device 101b and/or the user's mobile device 101a. For example, when the user gets into a car having computing device 101b the user can initiate the authentication process such that the user's location is not tracked by mobile device 101a or computing device 101b. In addition or alternatively, the user can be required to authenticate before being permitted to access/activate the car associated with the computing device 101b (e.g., start the car).

Provided the user's identity is authenticated, the system server 105 can grant access to the ACE (e.g., the computing device, the car and the like) or collect/provide access to the information recorded by those devices in accordance with the access rules associated with the user 124, the mobile device 101a, the computing device 101b, the ACE and the like. For example, if the user's preferences specify that the user's location information can be accessed by a spouse but should not be shared with a theft monitoring company, the system server 105 can grant access to the spouse and deny access to the theft tracking company. By way of further example, if an owner of a car specifies in the settings associated with the computing device 101b that a particular user has access to the car between 8 AM and 11 PM and that the location should be continuously monitored while in use by the particular user, the system server can permit, upon successful authentication/authorization, the particular user to access the car during the specified time window, can continuously monitor the location while in use, and can also provide access to the location information to the owner.

At this juncture, it should be noted that although much of the foregoing description has been directed to systems and methods for authorizing a user to access an access-controlled environment according to the user's biometric features, the systems and methods disclosed herein can be similarly deployed and/or implemented in scenarios, situations, and settings far beyond the referenced scenarios.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for authorizing a user to access an access-controlled environment. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed:

1. A method for securely coordinating access to an access-controlled environment (ACE) for a user operating a user computing device executing a biometric authentication application for confirming the user's identity as a function of a biometric of the user, the method comprising:
   receiving, by a trusted server from a user computing device, an application certificate that uniquely identifies a particular biometric authentication application executing on the user device, wherein the user computing device is the user's personal mobile computing device;
   verifying, by a trusted server, that the received application certificate is valid;
   receiving, by the trusted server from the user computing device, a representation of the user's identity and a representation of at least a component of the user computing device;
   testing the representation of the user's identity against a trusted set of user identification information to verify the user is authorized to access the ACE;
   providing a unique identifier that is assigned for the user based on the representation of the user's identity;
   causing, by the trusted server during user enrollment, generation of a key pair comprising a private key and a corresponding public key, wherein the private key and the unique identifier is stored by the user device;
   storing, by the trusted server in a storage medium, the public key in association with the assigned unique identifier thereby creating a registered instance of a user identity, wherein the identity instance is created as a function of verifying the application certificate, verifying the user identity and generation of the key pair;
   receiving, by the trusted server from the user device, a communication including: information asserting an identity of one or more of the user and the user device, a representation of the private key and a current biometric representation of the user's biometric features captured by the user device using an associated biometric capture device;
   authorizing the user to access the ACE, wherein the authorizing step comprises:
      identifying, by the trusted server based on the identification information, the user instance,
      verifying, by the trusted server based on the public key associated with the identified user instance, that the representation of the private key corresponds to the public key, and
      confirming, by the trusted server, that the current biometric representation captured by the user device matches a registered biometric representation of the user previously stored by the server in association with the identified user instance; and
   based on the authorizing step, facilitating the user access to the ACE using the trusted server in conjunction with one or more remote computing devices.

2. The method of claim 1, wherein the key-pair is unique to the user device and the corresponding user identity instance stored on the back-end storage such that the private key is useable by the user device to securely assert the user identity and the public key is useable by the trusted server to identify the user identity.

3. The method of claim 1, wherein the key-pair is generated using one or more of the user device and the trusted server.

4. The method of claim 1, further comprising:
   receiving, by the trusted server subsequent to creating the identity instance for the user, a request to access the ACE, wherein the request identifies the ACE and the user; and
   transmitting a prompt, by the trusted server to the user device in response to the request, prompting the user device to capture the user's biometrics using the biometric authentication application and an associated capture device, generate the current biometric representation and, as a result, transmit the communication to the trusted server that includes the current biometric representation.

5. The method of claim 4, wherein the request identifies a requested transaction to be performed by the user accessing the ACE and wherein the user authorization step is performed according to a level of security defined by the ACE for the requested transaction.

6. The method of claim 5, further comprising: performing additional biometrics-based user authorization as a function of the level of security.

7. The method of claim 1, wherein the step of facilitating the user access to the access-controlled environment using the trusted server in conjunction with one or more remote computing devices comprises: transmitting an authorization notification to a legacy authentication system of the ACE.

8. The method of claim 7, wherein the step of facilitating the user access to the ACE comprises: retrieving by the trusted server from a secure data store, account information associated with the user instance and the ACE, and transmitting the access account information to the legacy authentication system.

9. The method of claim 1, wherein the step of testing the representation of the user's identity to verify the user is authorized to access the access-controlled environment comprises: testing, by the trusted server, the representation of the user's identity against the trusted set of user identification information, wherein the trusted set of user identification information is maintained by a legacy authentication system of the ACE.

10. The method of claim 1, wherein the unique identifier is stored by the trusted server in the storage and is associated with access account information that is useable to provide the user access to the ACE.

11. The method of claim 10, wherein communications from the user device that are encoded using the private key and thereby securely asserts the user identity to the trusted server and is useable to identify any associated access account information.

12. A system for securely coordinating access to an access-controlled environment (ACE) for a user operating a user computing device executing a biometric authentication application for confirming the user's identity as a function of a biometric of the user, the system comprising:
a network communication interface;
a computer-readable storage medium;
one or more processors configured to interact with the network communication interface and the computer-readable storage medium and execute one or more software modules stored on the storage medium including;
an enrollment module, that that when executed configures the one or more processors to:
receive, from a user computing device, an application certificate that uniquely identifies a particular biometric authentication application executing on the user device, a representation of the user's identity and a representation of at least a component of the user computing device, wherein the user computing device is the user's personal mobile computing device,
verify that the received application certificate is valid;
test the representation of the user's identity against a trusted set of user identification information to verify the user is authorized to access the ACE, and
provide a unique identifier that is assigned for the user based on the representation of the user's identity;
cause generation of a key pair comprising a private key and a corresponding public key, wherein the private key and the unique identifier is stored by the user device;
a database module, that when executed configures the one or more processors to store the public key in association with the assigned unique identifier thereby creating a registered instance of a user identity, wherein the identity instance is created as a function of verifying the application certificate, verifying the user identity and generation of the key pair;
a communication module that when executed configures the one or more processors to receive, from the user device, a communication including: information asserting an identity of one or more of the user and the user device, a representation of the private key and a current biometric representation of the user's biometric features captured by the user device using an associated biometric capture device; and
an authorization module that that when executed configures the one or more processors to authorize the user to access the ACE based on the received communication, wherein authorization includes:
identifying, based on the identification information, the user instance,
verifying, based on the public key associated with the identified user instance, that the representation of the private key corresponds to the public key,
confirming that the current biometric representation captured by the user device matches a registered biometric representation of the user previously stored by the server in association with the identified user instance, and
facilitating, based on the authorization of the user, the user access to the ACE using the trusted server in conjunction with one or more remote computing devices.

13. The system of claim 12, wherein the key-pair is unique to the user device and the corresponding user identity instance stored on the back-end storage such that the private key is useable by the user device to securely assert the user identity and the public key is useable by the trusted server to identify the user identity.

14. The system of claim 12, wherein the key-pair is generated using one or more of the user device and the trusted server.

15. The system of claim 12, wherein the communication module further configures the one or more processors of the trusted server to:
receive, by the trusted server subsequent to creating the identity instance for the user, a request to access the ACE, wherein the request identifies the ACE and the user; and
wherein the authorization module further configures the one or more processors to transmit a prompt to the user device in response to the request, prompting the user device to capture the user's biometrics using the biometric authentication application and an associated capture device, generate the current biometric representation and, as a result, transmit the communication to the trusted server that includes the current biometric representation.

16. The system of claim 15, wherein the request identifies a requested transaction to be performed by the user accessing the ACE and wherein user authorization is performed by the trusted server according to a level of security defined by the ACE for the requested transaction.

17. The system of claim 16, further comprising: performing additional biometrics-based user authorization as a function of the level of security.

18. The system of claim 12, wherein the network communication interface communicatively connects the one or more processors of the trusted server with a legacy authentication system of the ACE and wherein the authorization module configures the one or more processors to facilitate the user access by transmitting an authorization notification to the legacy authentication system of the ACE.

19. The system of claim 18, wherein the authorization module configures the one or more processors to facilitate the user access by retrieving account information associated with the user instance and the ACE from a secure data store and transmitting the access account information to the legacy authentication system.

20. The system of claim 18, wherein the enrollment module configures the one or more processors to test the representation of the user's identity to verify the user is authorized to access the access-controlled environment by comparing the representation of the user's identity to a trusted set of user identification information maintained by the legacy authentication system of the ACE.

* * * * *